US012659263B2

(12) United States Patent
Kohn

(10) Patent No.: US 12,659,263 B2
(45) Date of Patent: Jun. 16, 2026

(54) APPARATUSES, METHODS, AND SYSTEMS FOR DYNAMIC DATA PACKAGE ROUTING

(71) Applicant: CrowdPoint Technologies, Inc., Austin, TX (US)

(72) Inventor: Wolf Kohn, Philadelphia, PA (US)

( * ) Notice: Subject to any disclaimer, the term of this patent is extended or adjusted under 35 U.S.C. 154(b) by 303 days.

(21) Appl. No.: 18/497,998

(22) Filed: Oct. 30, 2023

(65) Prior Publication Data

US 2024/0146640 A1 May 2, 2024

Related U.S. Application Data

(60) Provisional application No. 63/420,361, filed on Oct. 28, 2022.

(51) Int. Cl.
H04L 45/00 (2022.01)
H04W 40/02 (2009.01)

(52) U.S. Cl.
CPC ............. H04L 45/14 (2013.01); H04W 40/02 (2013.01)

(58) Field of Classification Search
CPC ....... H04L 45/00; H04L 45/14; H04L 41/142; H04L 41/16; H04W 40/00; H04W 40/02; G05B 13/00
See application file for complete search history.

(56) References Cited

U.S. PATENT DOCUMENTS 11,627,071 B2 * 4/2023 Mishra ................... H04L 45/16
709/238

FOREIGN PATENT DOCUMENTS

WO WO-2020100150 A1 * 5/2020 ......... H04L 45/7453

* cited by examiner

*Primary Examiner* — Mohamed A Kamara

(57) ABSTRACT

Apparatuses and methods are disclosed for dynamic data package routing. A method includes receiving criterion dynamics, constructing Dynkin operators in response to the criterion dynamics, constructing an interference matrix in response to the Dynkin operators, deploying an interference automaton equation in response to the interference matrix, performing prefix-loop decomposition to generate a control law, and outputting the control law.

8 Claims, 36 Drawing Sheets

200

300

Equational form of the Database$_t$ $$f_t\left(x_t, y_t, u_t\right) = z_{t+1}$$

From the Database $t$ $x_t$ instantiated data of the blob $t$ variable $y_t$ data acquired from Database $t$ $u_t$ variablepath segment to be determined by Dynamic Programming $z_{t+1}$ variable representing the interphase to Database$_{t+1}$ determined by Path evolution: $t \Rightarrow t+1$ and instatiated to $x_{t+1}$

FIG. 7

Protocol form  of the Database$_t$ $$g_t\left(x_t, y_t, u_t\right) \prec w_{t+1}$$

$\Downarrow$

From the Database $t$ $x_t$  instantiated data of the block $t$ variable $y_t$  data acquired from Database $t$ $u_t$  variable path segment to be determined by Dynamic Programming $w_{t+1}$  variable representing the interphase to Database$_{t+1}$ determined by path evolution: $t \Rightarrow t+1$ and instatiated to $x_{t+1}$ $\prec$  Indicates Logic containment, inequality $\leq$, or inequation $\neq$

FIG. 8

Rule form of the Database$_t$ $$s_t \left( x_t, y_t, u_t \right) \Leftarrow k \left( v_{t+1}, y_t, u_t \right)$$

From the Database $t$ $x_t$ instantiated data of the block $t$ variable $y_t$ data acquired from Database $t$ $u_t$ variable concurrency action to be determined by Dynamic Programming $v_{t+1}$ variable representing the interphase to Database$_{t+1}$ determined by Block chain evolution: $t \Rightarrow t+1$ and instantiated to $x_{t+1}$ $\Leftarrow$ indicates implication Variables are universally quantified

FIG. 9

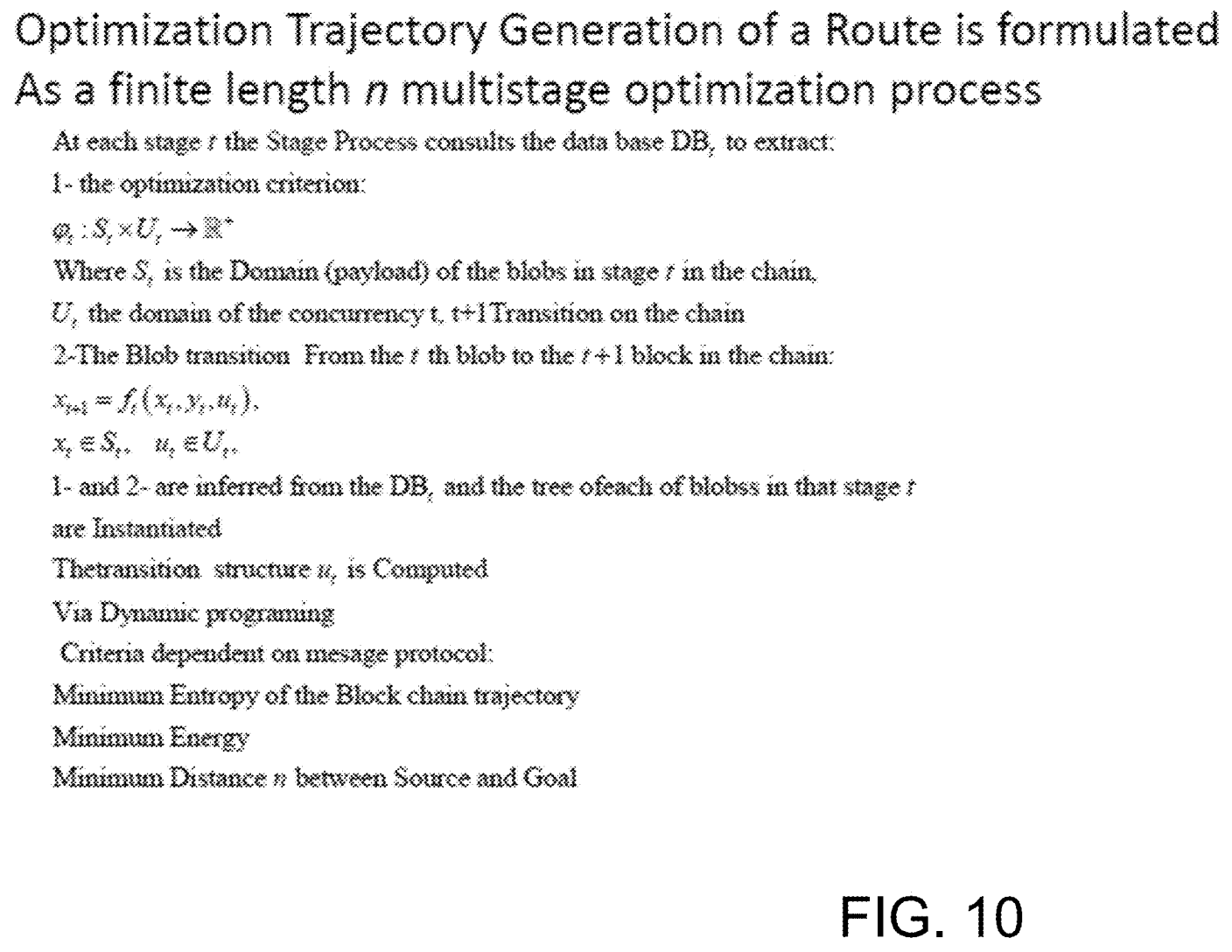

Optimization Trajectory Generation of a Route is formulated
As a finite length $n$ multistage optimization process At each stage $t$ the Stage Process consults the data base $DB_t$ to extract:

1- the optimization criterion:

$$\phi_t : S_t \times U_t \rightarrow \mathbb{R}^+$$

Where $S_t$ is the Domain (payload) of the blobs in stage $t$ in the chain.

$U_t$ the domain of the concurrency $t, t+1$ Transition on the chain

2-The Blob transition  From the $t$ th blob to the $t+1$ block in the chain:

$$x_{t+1} = f_t(x_t, y_t, u_t),$$

$$x_t \in S_t, \quad u_t \in U_t.$$

1- and 2- are inferred from the $DB_t$ and the tree of each of blobs in that stage $t$ are Instantiated The transition structure $u_t$ is Computed Via Dynamic programing Criteria dependant on message protocol:

Minimum Entropy of the Block chain trajectory

Minimum Energy

Minimum Distance $n$ between Source and Goal

FIG. 10

DP Formulation of a multi-stage Route Flow

A- Dynamic Programming Formulation of a multistage Block Chain is given by two items:

1- Performance Criterion  2- Block transition

1- Performance Criterion:

$$\min \sum_{t=0}^{T-1} \varphi_t(x_t, u_t) \qquad \varphi_t : S_t \times U_t \to \Re^+$$

$S_t$ The Domain of the block $t$ in the path $U_t$ the domain of $t$, $t+1$

Transition on route path

2- Route transition  From the $t$ th blob to the $t+1$ blob in the route $$x_{t+1} = f_t(x_t, y_t, u_t), \qquad \text{With initial state } (x(0) = x_t, y(0))$$

with $$x_t \in S_t, \quad u_t \in U_t, t = 0, \ldots, n-1$$

The concurrency structure $u_t$ is instantiated Via Bellman's Dynamic Programming Bellman's Dynamic Programming Recursion: :

$$\min \sum_{t=k}^{T-1} \varphi_t(x_t, u_t) \qquad x_k = z, \quad z \in S_k, \quad u_t \in W_t(x_t) \subseteq U_t, t = k, \ldots, n$$

Define: $V_k(z) = \min \sum_{t=k}^{T-1} \varphi_t(x_t, u_t) \qquad x_k = z, \quad z \in S_k, \quad u_t \in W_t(x_t) \subseteq U_t, t = k, \ldots, n$ $V_k$, $V_{k-1}$ Called the reward functions of the $k$th and $k$th stage of the blob route They Satisfy Bellman's equation:

$$V_k(y) = \min_{u_k \in W(y)} \{\varphi_k(y, u_k) + V_{k-1}(f_k(z, y, u_k))\}$$

with $$V_n(y) = 0 \quad \text{for all } y \in S \text{ at the terminal stage of the chain}$$

FIG. 11

Decomposition of the Dynamic Programming Recursion

Bellman DP Equation $$V_k(y) = \min_{u_k \in \mathcal{U}_k(y)} \left\{ \varphi(y, u_k) + V_{k+1}\left(f(f(y, u_k))\right) \right\} \quad (*)$$

In right hand side of $(*)$ $y$ is a Fixed, Generic block payload and $u_k$ is a variable representing Concurrency at the $k$th stage we write $$V_k(y) = \min_{u_k \in \mathcal{U}_k(y)} h(y, u_k) \quad (**)$$

with $$h(y, u_k) = \varphi(y, u_k) + V_{k+1}\left(f(f(y, u_k))\right) \quad (***)$$

In the right hand side of $(***)$, we treat $y$ as a variable and keep $u_k$ as a parameter This suggests the definition of an operator representation (Dynkin operators)

of the dynamic Dynamic Programming recursion that is amenable for an iterative realization

FIG. 12

Dynkin Operators

Introduce two operator families $P_k$ and $R_k$, $k = 0, \ldots, n$ $P_k$: Transforms functions on Concurrencies to functions on Block payloads:

$$P_k h(y, \hat{u}_k) = \min_{u_k \in W_k(y)} h(y, u_k) \quad W_k(y) \subseteq U, y \in S, \ \hat{u}_k = \arg \min_{u_k \in W_k(y)} h(y, u_k)$$

$W_k(y)$: The possible concurrency actions when the payload state is $y$ and the stage is $k$ $R_k$: Transforms functions on payloads to functions on concurrencies:

$$R_k h(\hat{y}, u_k) = \varphi(\hat{y}, u_k) + h(\mathcal{F}((\hat{y}, u_k))), \quad \hat{y} \in S, \ x_k = y$$

$\hat{y}$ is the payload reached by applying the concurrency action $u_k$ starting from $x_k$

FIG. 13

DP Bellman equation in terms of Dynkin Operators $$V_k(y) = \min_{u_k \neq \mathcal{U}_{k}(y)} \left\{ \varphi(y, u_k) + V_{k+1}\left( f(y, u_k) \right) \right\}$$

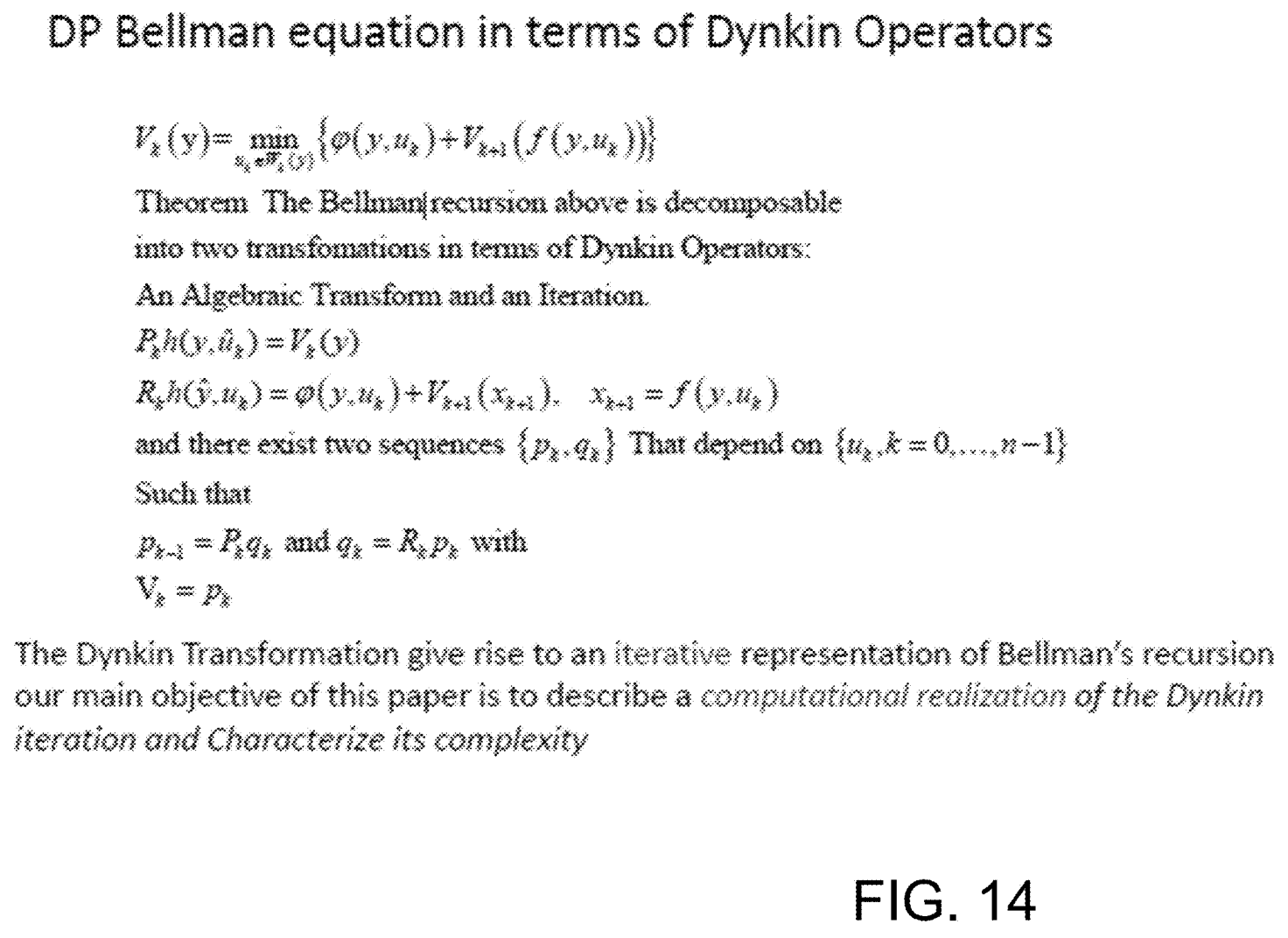

Theorem The Bellman recursion above is decomposable into two transformations in terms of Dynkin Operators:

An Algebraic Transform and an Iteration.

$$P_k h(y, u_k) = V_k(y)$$

$$R_k h(\hat{y}, u_k) = \varphi(y, u_k) + V_{k+1}(x_{k+1}), \quad x_{k+1} = f(y, u_k)$$

and there exist two sequences $\{p_k, q_k\}$ that depend on $\{u_k, k = 0, \ldots, n-1\}$ Such that $$p_{k+1} = P_k q_k \text{ and } q_k = R_k p_k \text{ with}$$

$$V_k = p_k$$

The Dynkin Transformation give rise to an iterative representation of Bellman's recursion our main objective of this paper is to describe a *computational realization of the Dynkin iteration and Characterize its complexity*

FIG. 14

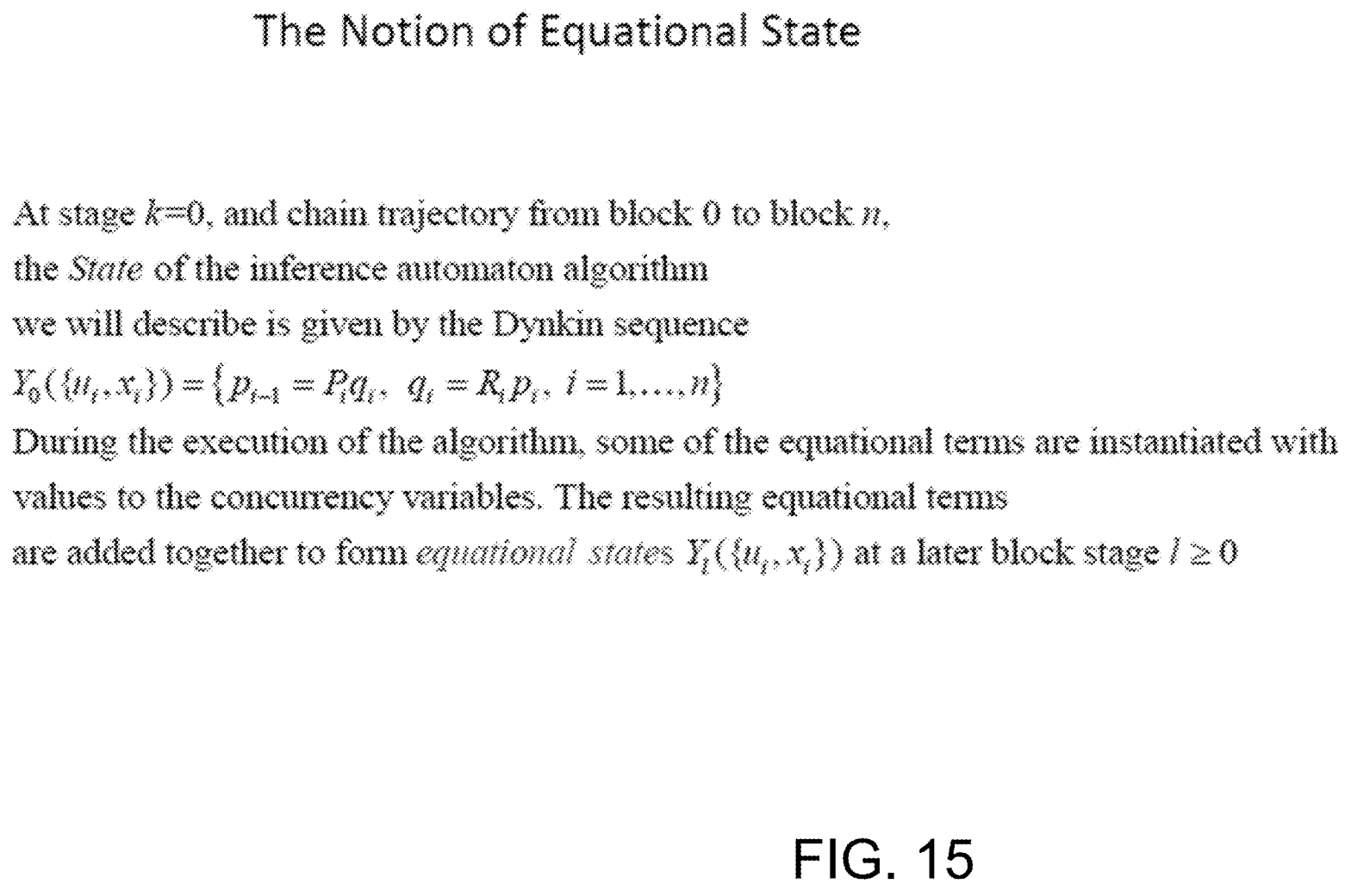

The Notion of Equational State

At stage $k=0$, and chain trajectory from block 0 to block $n$, the *State* of the inference automaton algorithm we will describe is given by the Dynkin sequence $$Y_0((u_i, x_i)) = \{p_{i-1} = Pq_i, \; q_i = R_i p_i, \; i = 1, \ldots, n\}$$

During the execution of the algorithm, some of the equational terms are instantiated with values to the concurrency variables. The resulting equational terms are added together to form *equational states* $Y_l((u_i, x_i))$ at a later block stage $l \geq 0$

FIG. 15

Inference Automaton Dynamics

Inference Automaton Evolution:

Super set $q_t = \{P_t, R_t\}$ Contains sets of Dynkin's sequences of equations $Y_k = E(q_t) \bullet Y_k + K(q_t)$ Partial Inference Automaton implementation $\varrho_{t,t+1} = \hat{u}(Y_k) = u_k(y)$ Partial Concurrency Generation: it assigns control values in the equational forms $Y_k$ $t = 1,2,\ldots,n,\ldots$ $\varrho_{t,t+1}$ Concurrency Transition Given partial resolution $$q_{t+1} = \begin{cases} \delta(q_t, \varrho_{t,t+1}) & \text{Equational transition of the automaton} \\ q_N & \text{Transition if terminal stage of the automaton} \end{cases}$$

$q_N$ is terminal if the Dynkin equations do not contain unistantiated variables In our implementation the control law is a function equational form
defined by the Dynkin operators

FIG. 17

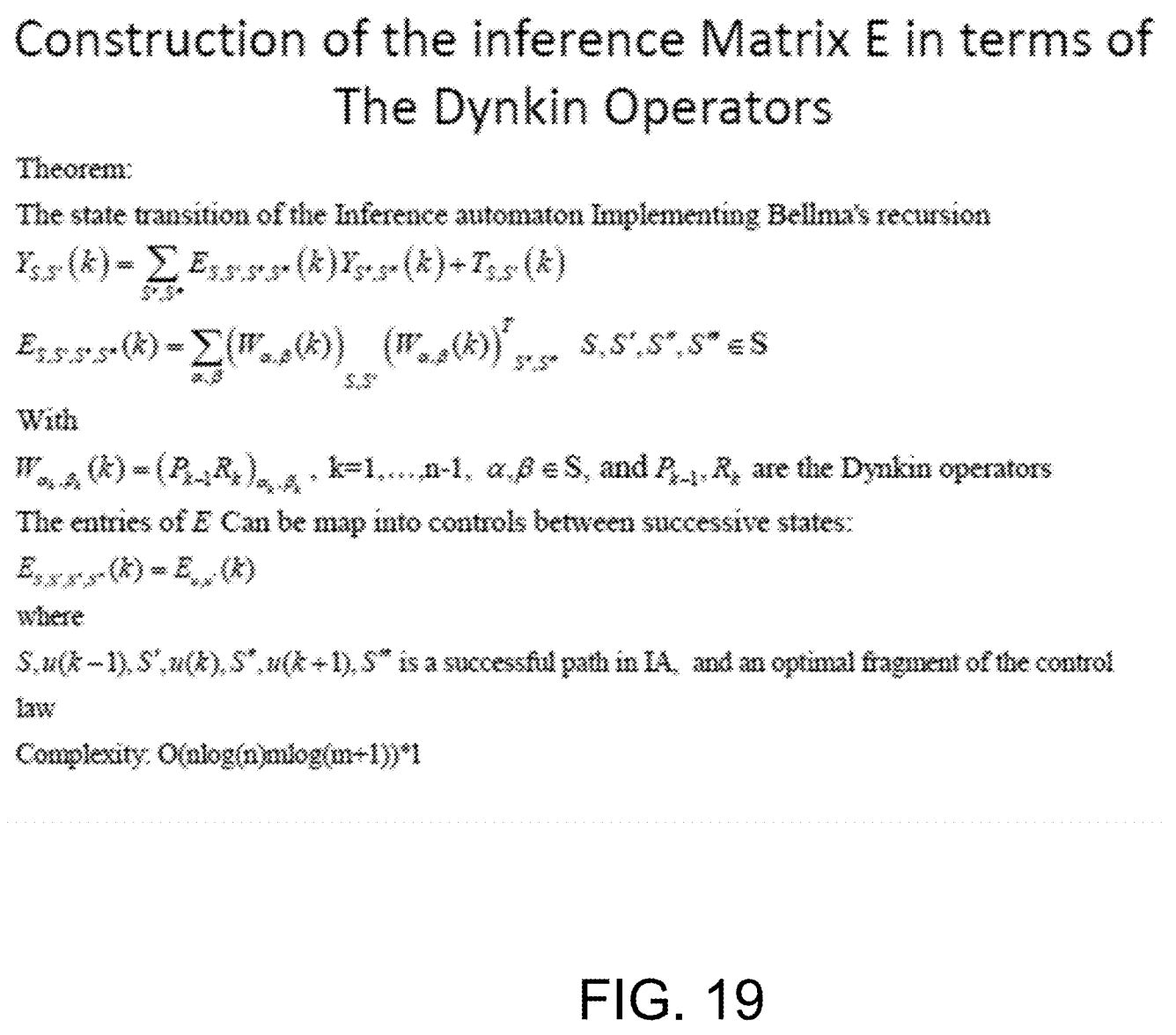

Construction of the Inference Matrix E in terms of The Dynkin Operators

Theorem:

The state transition of the inference automaton implementing Bellman's recursion $$I_{S,S'}(k) = \sum_{S''} E_{S,S'';S',S''}(k) I_{S'',S'}(k) + I_{S,S'}(k)$$

$$E_{S,S'';S',S''}(k) = \sum_{\alpha,\beta} \left(W_{\alpha,\beta}(k)\right)_{S,S'} \left(W_{\alpha,\beta}(k)\right)^T_{S',S''} \quad S,S',S'',S''' \in S$$

With $$W_{\alpha,A}(k) = (R_{k-1}R_k)_{\alpha,A}, \quad k=1,\ldots,n-1, \quad \alpha,\beta \in S, \text{ and } R_{k-1}, R_k \text{ are the Dynkin operators}$$

The entries of $E$ Can be map into controls between successive states:

$$E_{S,S'';S',S''}(k) = E_{u,u'}(k)$$

where $$S, u(k-1), S', u(k), S'', u(k+1), S''' \text{ is a successful path in IA, and an optimal fragment of the control law}$$

Complexity: $O(n\log(n)n\log(n-1))^{-1}$

FIG. 19

Solution of Inference Automation Equation

Theorem: IA Equation is solvable if it is "Lyapunov stable" and the domain has quasi-regular convergence.

$$Y = E \circ Y + T$$

Iteration to IA equation $$X_{k+1} = E \circ X_k + T$$

$$X_1 = E \circ X_0 + T$$

$$X_2 = E \circ X_1 + T = E^2 \circ X_0 + E \circ T + T$$

$$\vdots$$

$$X_N = E^N \circ X_0 + \sum_{i=0}^{N-1} E^i \circ T$$

$$\omega = S(T, \cdot) = u_N(Y)$$

let $E^* = \sum_{i=0}^{\infty} E^i$ as $N \to \infty$:   $E^N \to 0$,   $Y_N \to Y$,   $\Rightarrow$   $Y = E^* \circ T$

| Lyapunov Stability ↑ | Contraction Mapping ↑ | Quasiregular Convergence ↑ |
|---|---|---|

FIG. 20

Inference automaton (IA) with Two Level Decomposition

IA Equation: computes the Equational transformation of the entire system.

$$\begin{bmatrix} X_1 \\ X_2 \end{bmatrix} = \begin{bmatrix} E_{1,1} & E_{1,2} \\ E_{2,1} & E_{2,2} \end{bmatrix} \circ \begin{bmatrix} X_1 \\ X_2 \end{bmatrix} + \begin{bmatrix} T_1 \\ T_2 \end{bmatrix} \qquad (1)$$

Two-Coupled IA Equations:

$$X_1 = E_{1,1} \circ X_1 + E_{1,2} \circ X_2 + T_1$$
$$X_2 = E_{2,1} \circ X_1 + E_{2,2} \circ X_2 + T_2 \qquad (2)$$

Theorem: (1) and (2) have exactly the same solutions iff:

$$E_{2,1} \circ E_{1,1}^* \circ E_{1,2} \text{ is an invariant of state trajectory of IA 1}$$

and $$E_{1,2} \circ E_{2,2}^* \circ E_{2,1} \text{ is an invariant of state trajectory of IA 2}$$

FIG. 21

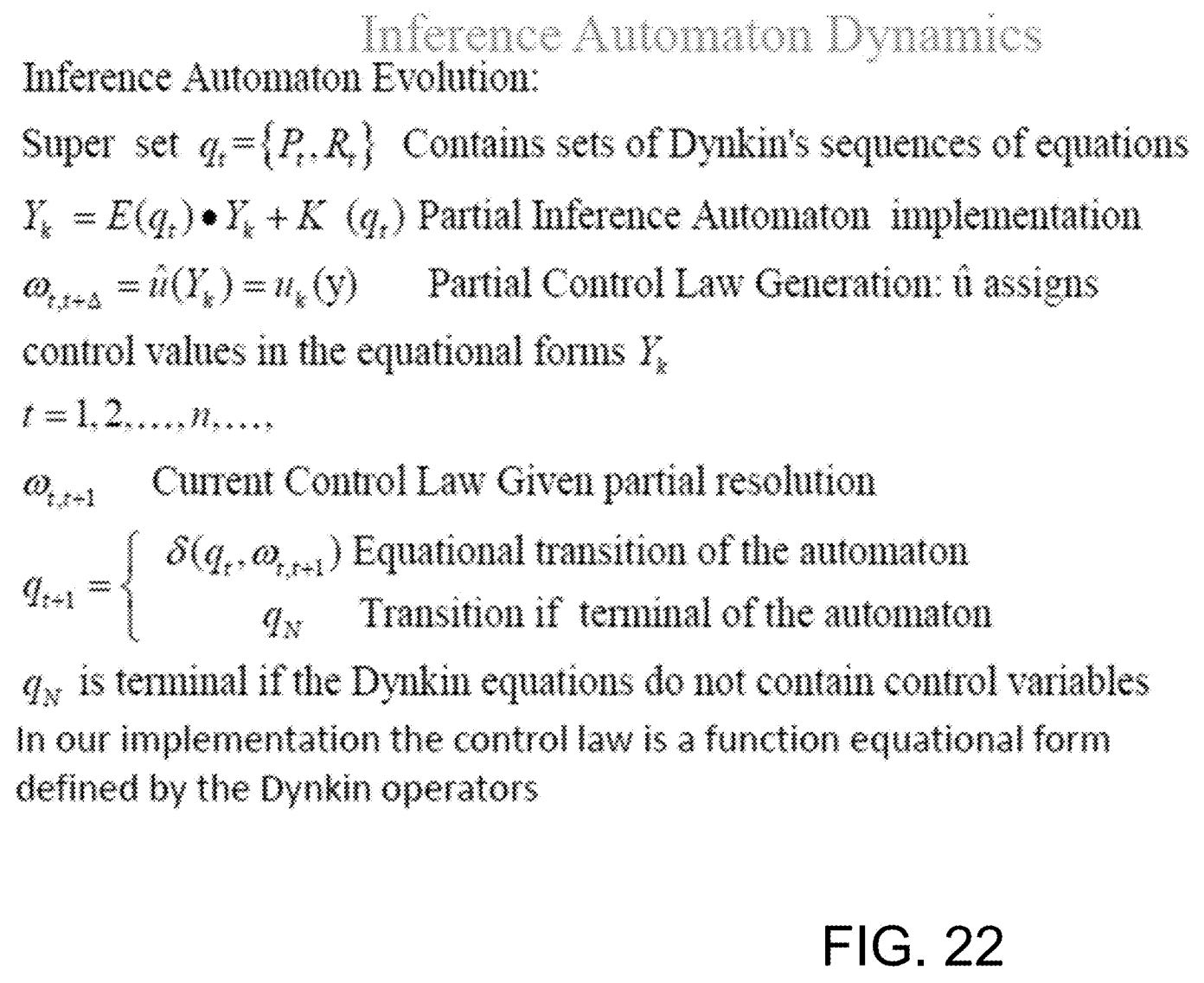

Inference Automaton Dynamics

Inference Automaton Evolution:

Super set $q_t = \{P_t, R_t\}$ Contains sets of Dynkin's sequences of equations $Y_k = E(q_t) \bullet Y_k + K(q_t)$ Partial Inference Automaton implementation $\omega_{t+\Delta} = \hat{u}(Y_k) = u_k(y)$ Partial Control Law Generation: it assigns control values in the equational forms $Y_k$ $t = 1, 2, ..., n, ...$ $\omega_{t+1}$ Current Control Law Given partial resolution $$q_{t+1} = \begin{cases} \delta(q_t, \omega_{t+1}) & \text{Equational transition of the automaton} \\ q_N & \text{Transition if terminal of the automaton} \end{cases}$$

$q_N$ is terminal if the Dynkin equations do not contain control variables In our implementation the control law is a function equational form defined by the Dynkin operators

FIG. 22

Inference Automaton N-level Decomposition

Equations for n Subsets:

$$\begin{bmatrix} X_1 \\ \vdots \\ X_a \end{bmatrix} = \begin{bmatrix} E_{1,1} & \cdots & E_{1,a} \\ \vdots & \cdots & \vdots \\ E_{a,1} & \cdots & E_{a,a} \end{bmatrix} \circ \begin{bmatrix} X_1 \\ \vdots \\ X_a \end{bmatrix} + \begin{bmatrix} T_1 \\ \vdots \\ T_a \end{bmatrix} \quad (1)$$

Theorem: With respect to every IA, equations are equivalent to a 2-level IA.

Proof: Consider IA 1. For other IA's proof is similar. Partition (1) as follows:

$$\begin{bmatrix} X_1 \\ \vdots \\ X_a \end{bmatrix} = \begin{bmatrix} E_{1,1} & \cdots & E_{1,a} \\ \vdots & \cdots & \vdots \\ E_{a,1} & \cdots & E_{a,a} \end{bmatrix} \circ \begin{bmatrix} X_1 \\ \vdots \\ X_a \end{bmatrix} + \begin{bmatrix} T_1 \\ \vdots \\ T_a \end{bmatrix}$$

i.e., $$\begin{bmatrix} X_1 \\ X_c \end{bmatrix} = \begin{bmatrix} E_{1,1} & E_{1,c} \\ E_{c,1} & E_{c,c} \end{bmatrix} \circ \begin{bmatrix} X_1 \\ X_c \end{bmatrix} + \begin{bmatrix} T_1 \\ T_c \end{bmatrix}$$

FIG. 23

Paths in an inference Automaton that do not contribute to a solution

Trim IA: Every path is accessible and Co-accessible

1800

Start

1805 Receive a package to transmit

1810 Identify optimum path through groups of nodes (blobs) to target

1815 Complete transmission

End 2005 2000

Initialization

Input 1 – Initial parameters (for next blobs $k = 1, 2, ..., Blobs$): window length $\Delta_T^{(k)}$; number of blobs to be sampled in half window: $K^{(k)}$; buffer size: $\delta_T^{(k)} = \Delta_T^{(k)}/(2 * K^{(k)})$, Number of steps within $\delta_T^{(k)}$ time segment: $n_{st}^{(k)}$ Input 2 – rules (for blob $k = 1, 2, ..., Blobs$):

- equations regarding to local blob Hamiltonian and Lagrangian

- blob desired Hamiltonian, desired Lagrangian and its derivatives

- Hard rule matrix and vector (each entry of vector or matrix is an equation)

- Synchronization control law parameters

- equations regarding to blob quenched mean blob field Hamiltonian

4*. local blob Hamiltonian is the local blob Hamiltonian with hard rules, i.e.

where for $k = 1, 2, ..., l$ are hard rules

Grouping the terms with control variable and the terms without, is given by:

where

5*. is desired Lagrangian of blob i, is its corresponding desired Hamiltonian. The is used to construct synchronization criterion which measures the performance differences between the blob Hamiltonian and the desired Hamiltonian, i.e.

where is quenched mean field Hamiltonian for $i^{th}$ blob in the route

6*. The synchronized Hamiltonian is , where is quenched mean field Hamiltonian for $i^{th}$ blob is local Hamiltonian of $i^{th}$ blob

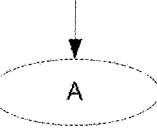

APPARATUSES, METHODS, AND SYSTEMS FOR DYNAMIC DATA PACKAGE ROUTING

CROSS-REFERENCE TO RELATED APPLICATION

This application claims the benefit of U.S. Provisional Patent Application No. 63/420,361, filed Oct. 28, 2022, which is incorporated herein by reference in its entirety.

FIELD

The subject matter disclosed herein relates generally to wireless communications and more particularly relates to apparatuses, method, and systems for dynamic data package routing.

BACKGROUND

Currently, mobile 5G networks have an excess amount of available capacity. This is because mobile 5G network infrastructure has been upgraded from 4G to accommodate for 5G capacity. However, software routing performance lags, thus, the network does not truly deliver 5G performance. In other words, devices on the mobile 5G network are not optimized to take advantage of the excess capacity available on the network.

SUMMARY

Methods for dynamic routing. Apparatuses and systems also perform the functions of the methods.

A method includes receiving criterion dynamics, constructing Dynkin operators in response to the criterion dynamics, constructing an inference matrix in response to the Dynkin operators, deploying an inference automaton equation in response to the inference matrix, performing prefix-loop decomposition to generate a control law, and outputting the control law.

An apparatus for wireless communication includes a processor and a memory coupled to the processor. The processor is configured to cause the apparatus to receive criterion dynamics, construct Dynkin operators in response to the criterion dynamics, construct an inference matrix in response to the Dynkin operators, deploy an inference automaton equation in response to the inference matrix, perform prefix-loop decomposition to generate a control law, and output the control law.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7 is an equation illustrating one embodiment of dynamic stage transition;

FIG. 8 is a protocol illustrating one embodiment of dynamic stage transition;

FIG. 9 is a rule illustrating one embodiment of dynamic stage transition;

FIG. 10 is a process illustrating one embodiment of optimization;

FIG. 11 is a process illustrating one embodiment of dynamic programming of a multistage block chain;

FIG. 12 is a process illustrating one embodiment of a dynamic programming optimization flow process;

FIG. 13 illustrates Dynkin operators;

FIG. 14 is a process illustrating one embodiment of a dynamic programming Bellman execution process using Dynkin operators;

FIG. 15 illustrates operators formed in accordance with an embodiment;

FIG. 17 is a process illustrating one embodiment of inference automation dynamics;

FIG. 19 is a process illustrating one embodiment of construction of the automaton transition matrix;

FIG. 20 is an algorithm illustrating one embodiment of solvability of an automaton inference process;

FIG. 21 is an algorithm illustrating one embodiment of a decomposition of the automaton transition process;

FIG. 22 shows algorithms illustrating one embodiment of state representation of an inference automaton;

FIG. 23 is an algorithm illustrating one embodiment of an inference N-level automaton decomposition;

FIGS. 34A-E are respective flow diagrams illustrating one embodiment of an inference automaton process.

DETAILED DESCRIPTION

Figure 1:
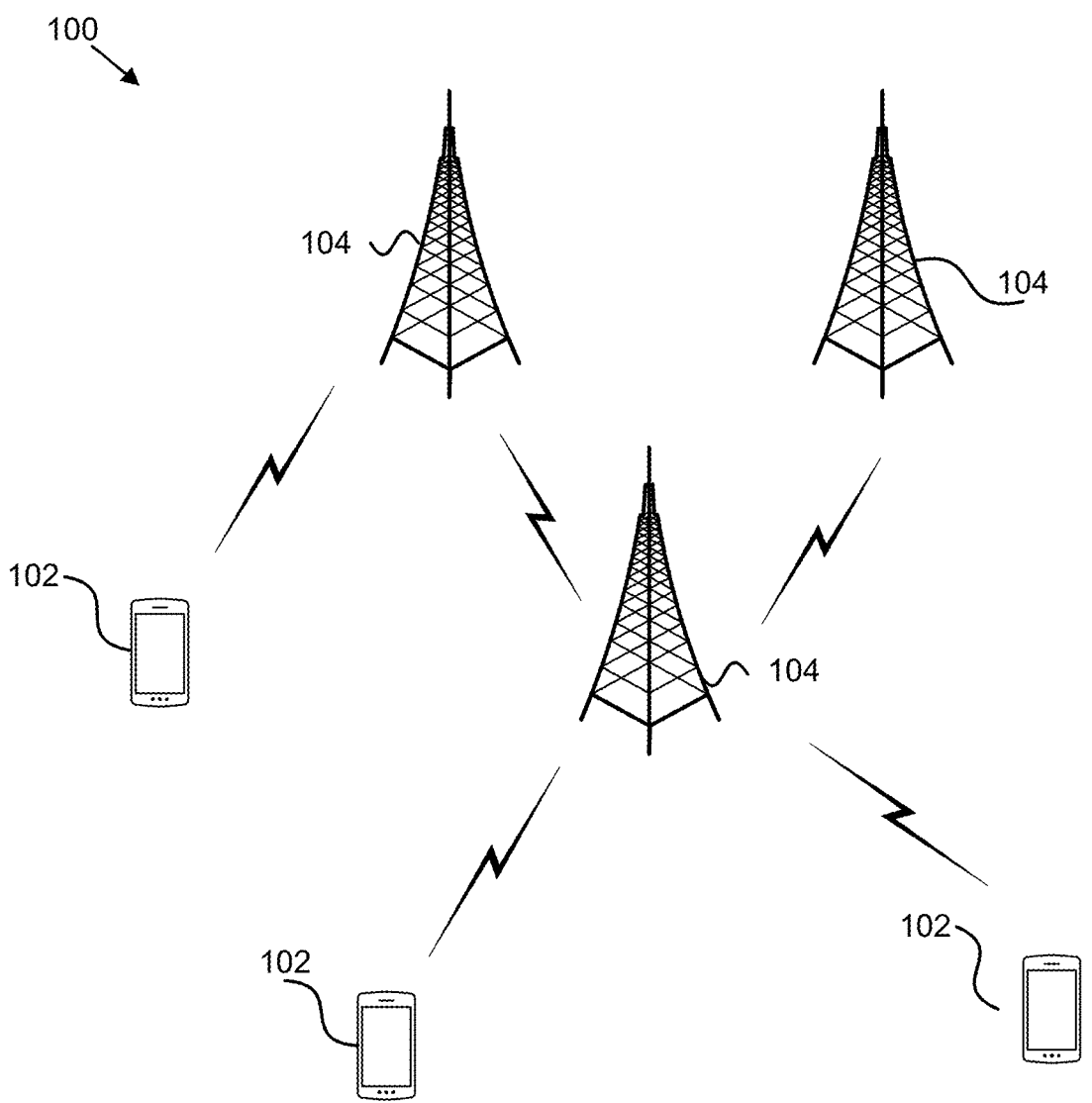
FIG. 1 is a schematic block diagram illustrating one embodiment of a wireless communication system for performing dynamic package routing.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for dynamic package routing. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle onboard computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the network unit 104 transmits using an orthogonal frequency division multiplex ("OFDM") modulation scheme on the DL and the remote units 102 transmit on the UL using a SC-frequency division multiple access ("FDMA") scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

Figure 2:
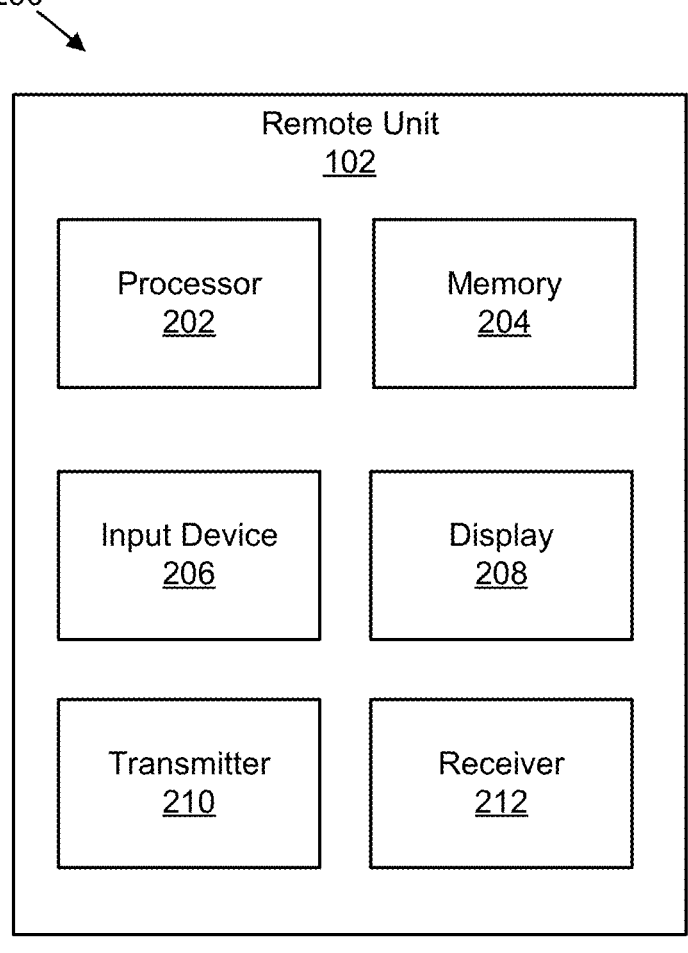
FIG. 2 is a schematic block diagram illustrating one embodiment of an apparatus that may be used as a scheduling user equipment.

FIG. 2 depicts one embodiment of an apparatus 200 that may be used for dynamic package routing. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
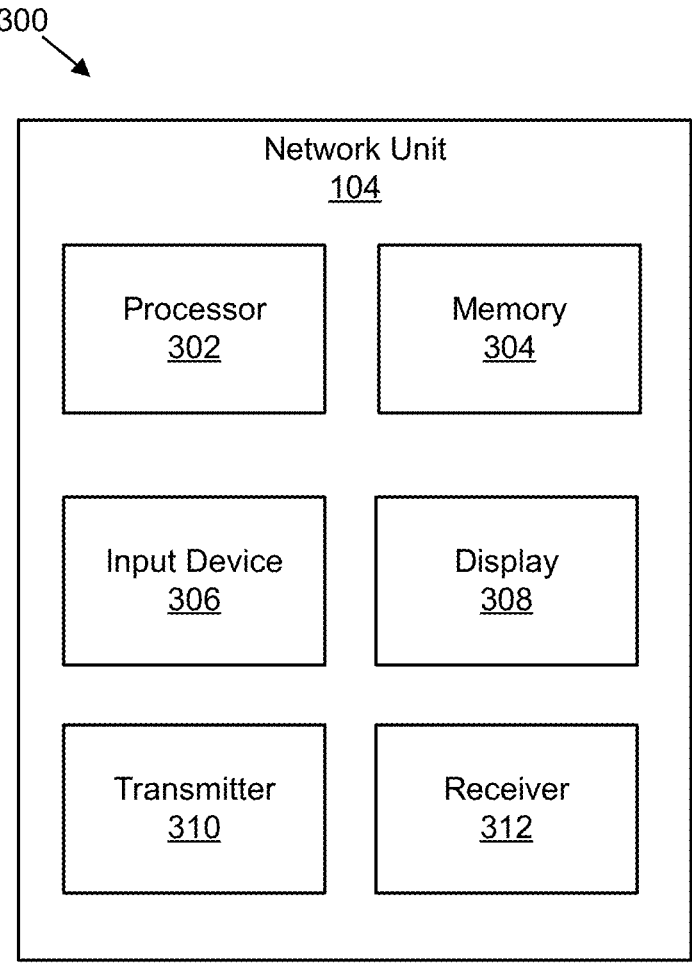
FIG. 3 is a schematic block diagram illustrating one embodiment of an apparatus that may be used for selection of a scheduling user equipment.
Figure 4:
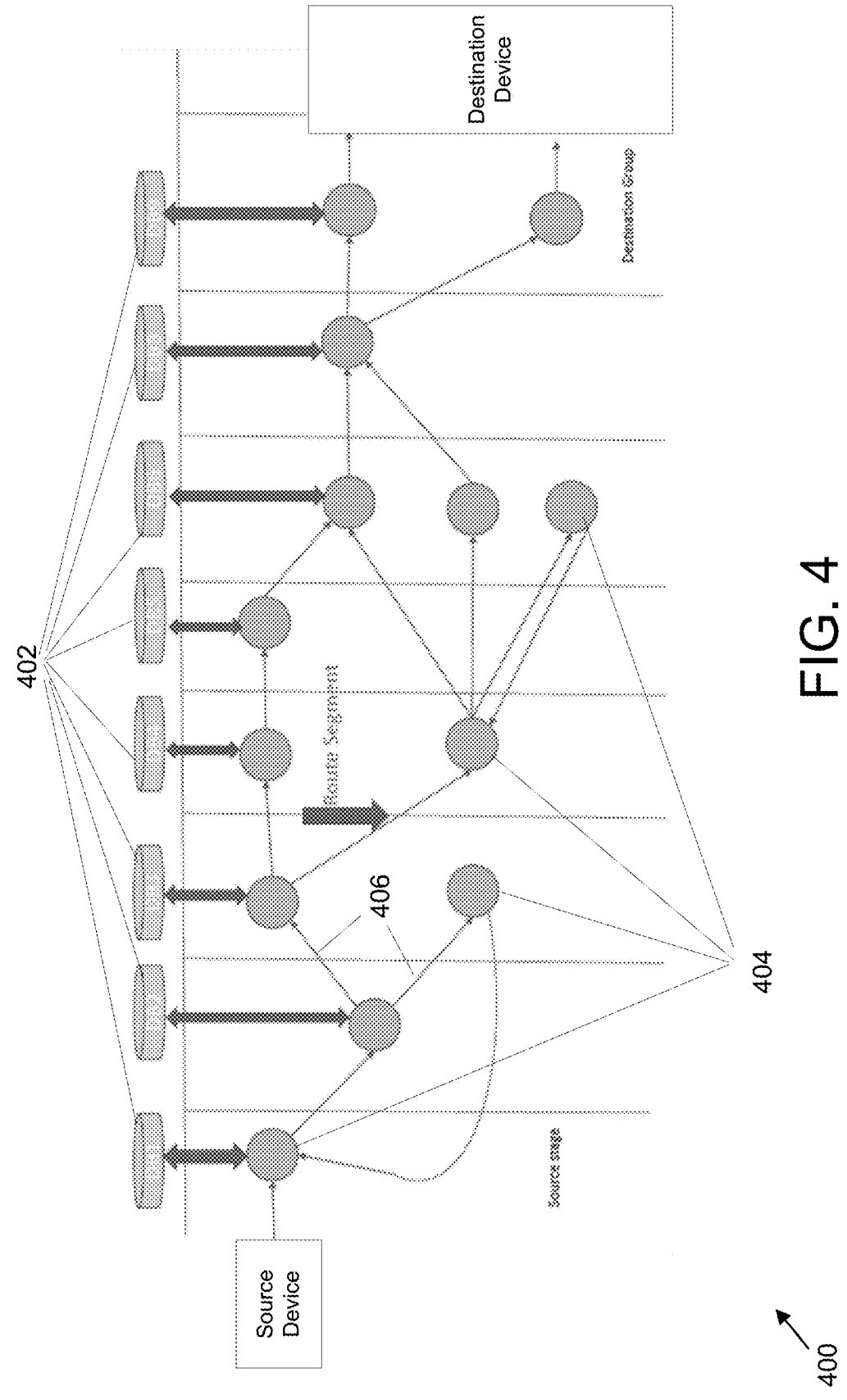
FIG. 4 is a schematic block diagram illustrating transitions in a block chain from a given source block.

FIG. 3 depicts one embodiment of an apparatus 300 that may be grouped with other apparatuses 300 to form groups of nodes ("blocks" or "blobs") 404 (see, e.g., FIG. 4) across a network 400 (see, e.g., FIG. 4). Accordingly, each blob 404 can include one apparatus 300 or multiple apparatuses 300. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 5:
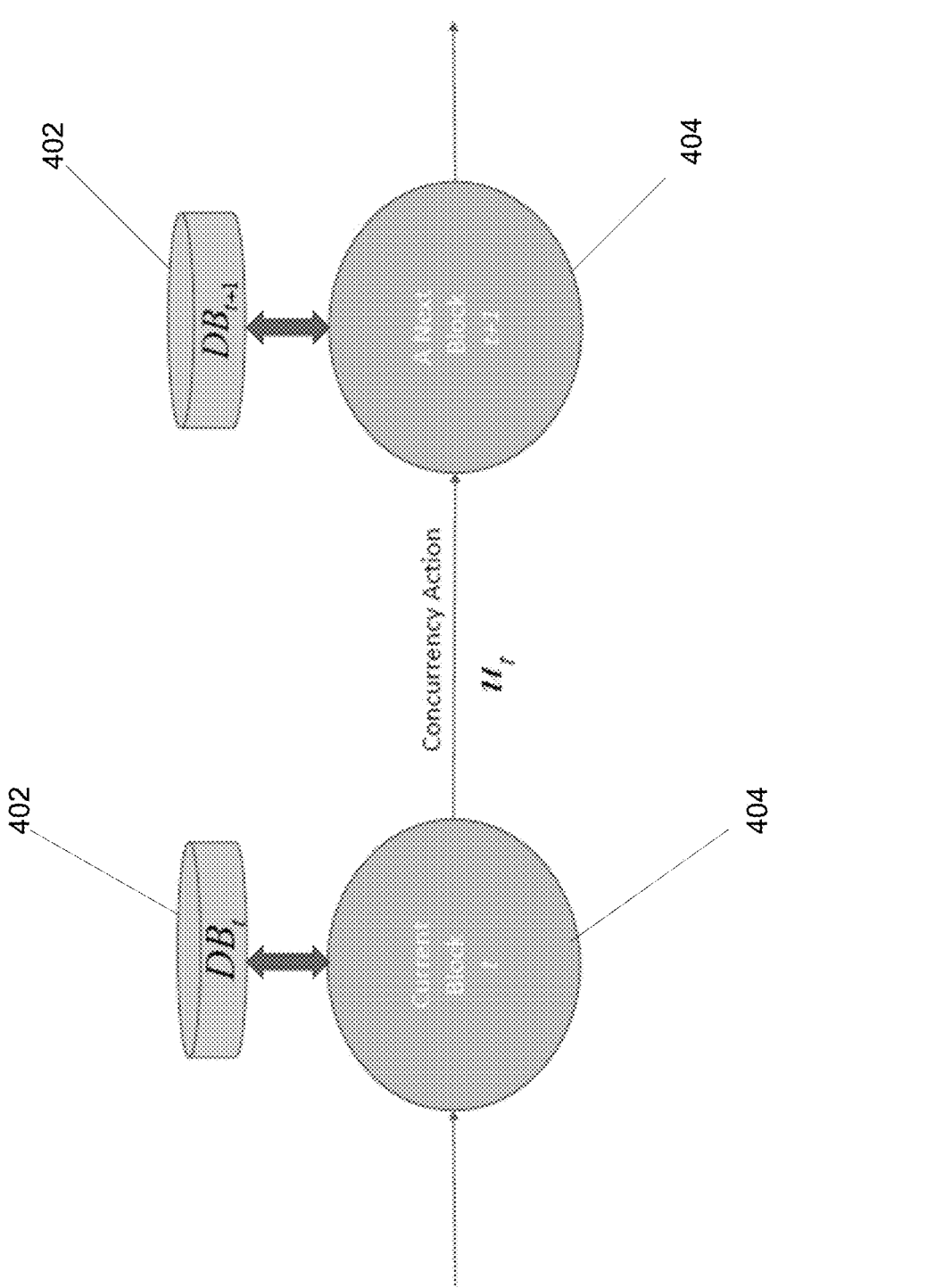
FIG. 5 illustrates a transition between blobs of the block chain of FIG. 4.

Referring to FIG. 4, in various embodiments, a diagram 400 of the present disclosure shows block chain transitions in a block chain from a given source block (e.g., source device) to a destination block (e.g., destination device or target) as performed by a multistage process. FIG. 4 shows a nondeterministic multistage flow of a message through sequence of blobs 404. Each component flow loads instances of operational rules. At each stage, a model incorporates information to blobs 404 in a given stage from a database 402 or databases 402 associated with the given stage in a path 406 of a chain being generated. A stage is a time dependent fragment of a routing algorithm associated with the current block/blob 404. A stage is associated with a blob 404 or more than one blob 404. A stage may not be associated with a blob 404, thereby initiating a restart from the previous successful blob 404. A chain is a number of blobs 404 connected via paths 406 from the source device to the destination device. The multistage process is performed using a distributed algorithm that generates block chain transition trajectories and corresponding concurrency actions. The multistage process performs optimization for selecting optimal feedback concurrencies connecting the blobs 404. An optimizations trajectory is recursive decomposition hereinafter termed an inference automaton ("IA"), which can be a state abstract machine. Synthesis of an implementation of IA involves a prefix-unitary decomposition. At each stage, the multistage process incorporates information of the blobs 404 in a stage from an appropriate database 402. The multistage process may be a distributed algorithm. FIG. 5 illustrates a transition between two blobs 404.

The process is formulated as an optimization problem to select Optimal Feedback Concurrencies connecting the blobs. The optimization trajectory is specified by a Dynamic Programming Algorithm ("DP"). The DP is executed by a computable structure called Inference Automaton ("IA"), which is a state abstract machine. The synthesis of an implementation of IA involve a Prefix-Unitary decomposition. The computability is illustrated with a small complexity test.

In FIGS. 6-16, a blob payload and route transition of each of stage of a blob route trajectory has been reformulated via Dynkin operators as a set of simultaneous equations. The IA reduces the number of uninstantiated variables at each block stage so that at the block corresponding to the end block of the chain all the variables are instantiated. The IA solves the trajectory equations of the source blob through autonomous stage-to-stage transitions.

Figure 6:
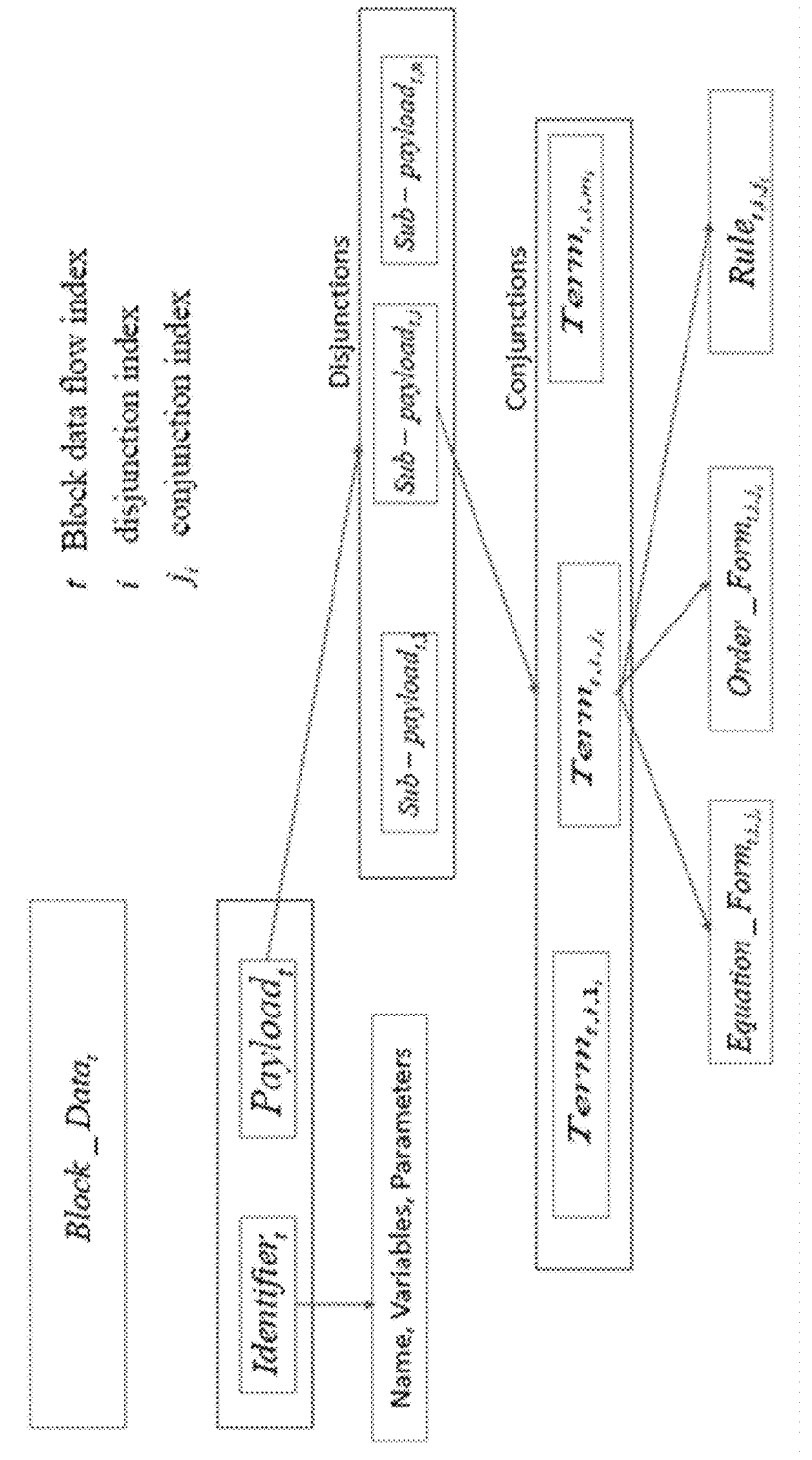
FIG. 6 is a flow diagram for operations performed at or for the blobs of FIG. 4.

FIG. 6 illustrates syntax of each rule for the operation of the blobs 404.

Referring to FIG. 7, at execution, the instance of the rules determines a dynamic stage transition (i.e., the state variable vector) that carries the current blob status of the initiated message. The y vector carries configuration requirements of the blob 404. The u vector, determined by the DP, determines the evolution of the message.

Referring to FIG. 8, the protocol of the next stage is determined whether it belongs to a different network.

Referring to FIG. 9, an instance of a rule from the database is determined.

FIG. 10 shows a generic optimization process for calculating transitions between the blobs 404.

FIG. 11 shows an exemplary DP optimization flow process.

FIG. 12 shows decomposition of the DP optimization flow process into two sub-steps: 1) computing the state (message) transition; and 2) a sub-step to compute action that determines the next blob 404. Decomposition is computed via Dynkin operators.

FIG. 13 shows definitions of Dynkin operators.

FIG. 14 shows a DP Bellman execution process via Dynkin operators. The Dynkin transformation gives rise to an iterative representation of Bellman's recursion.

Referring to FIG. 15, at each blob 404 in the message flow active rules are translated to equational forms in terms of the Dynkin operators.

Figure 16:
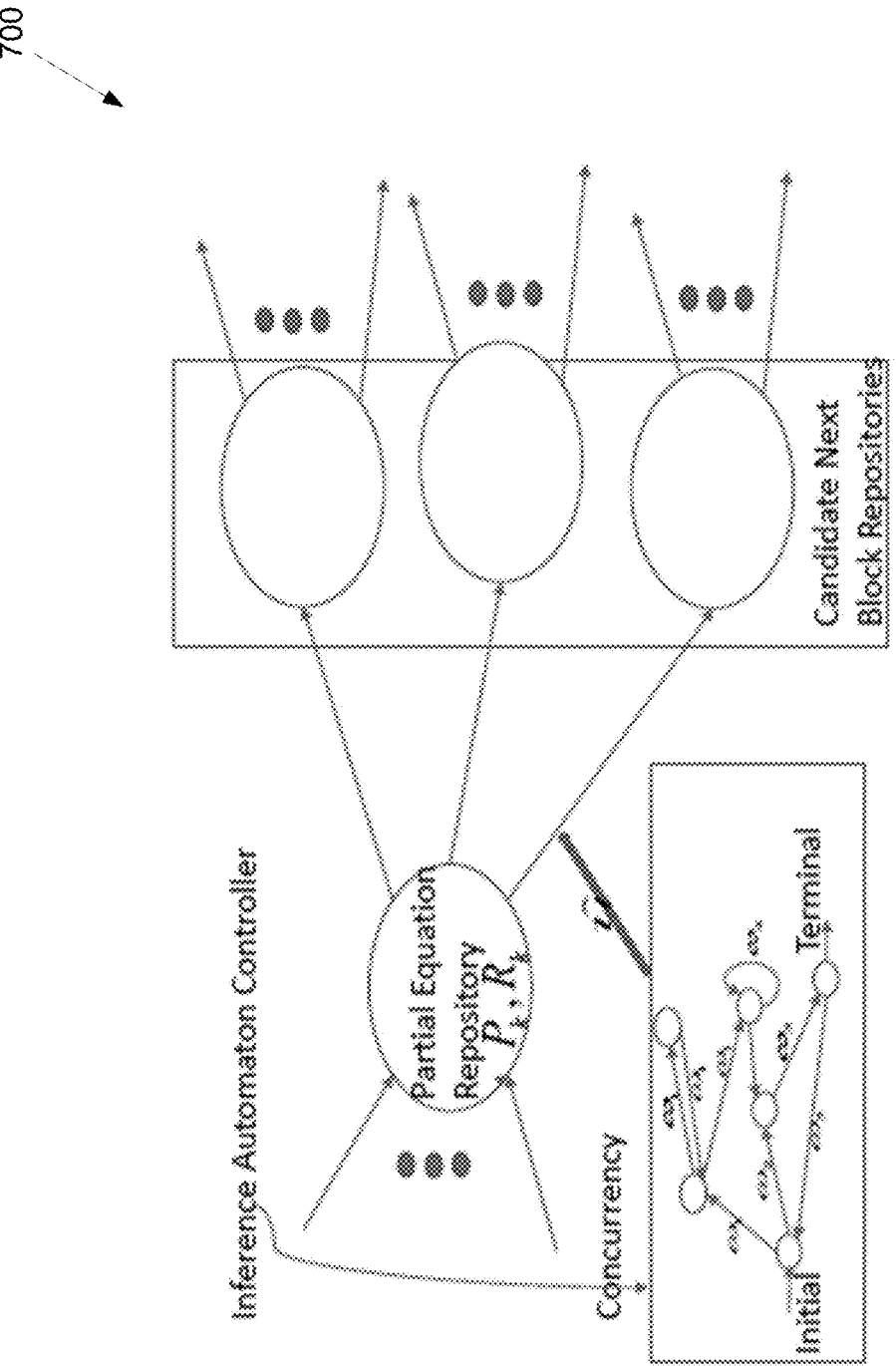
FIG. 16 is a schematic block diagram illustrating one embodiment of a dynamic programming algorithm.

FIG. 16 shows automaton representation of the DP algorithm into a two-stage process. A stage transition of equational states is determined by a concurrency automaton determining the edge transition action(s). An IA transition graph 700 is shown. An IA controller is an iterative computable representation using the Dynkin Operators. The transition in general is not deterministic and selection of a next stage is determined by selecting as a next block the one that has the highest instantiation of the payload variables.

FIGS. 17-21 relate to the IA transition graph 700. FIG. 17 shows an exemplary automaton execution process.

Figure 18:
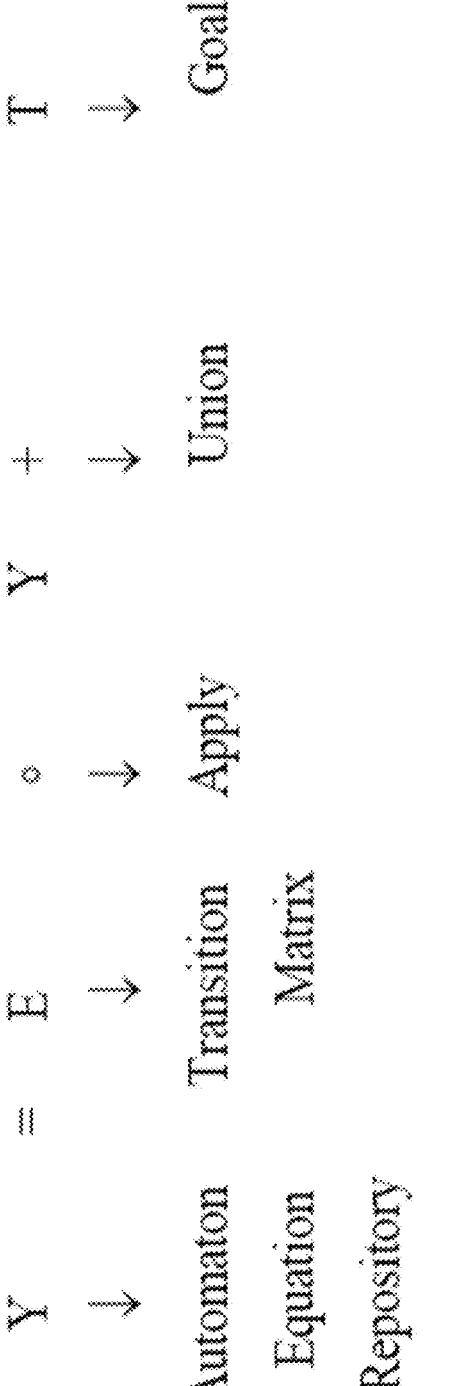
FIG. 18 is an algorithm illustrating one embodiment of an automation transition algorithm.

FIG. 18 shows an exemplary algorithm for automaton transition.

FIG. 19 shows construction of the automaton transition matrix E.

FIG. 20 shows solvability of the automaton inference process.

FIG. 21 shows decomposition of the automaton transition process.

FIG. 22 shows state representation of the inference automaton.

FIG. 23 shown inference N-level automaton decomposition.

Figures 24, 25:
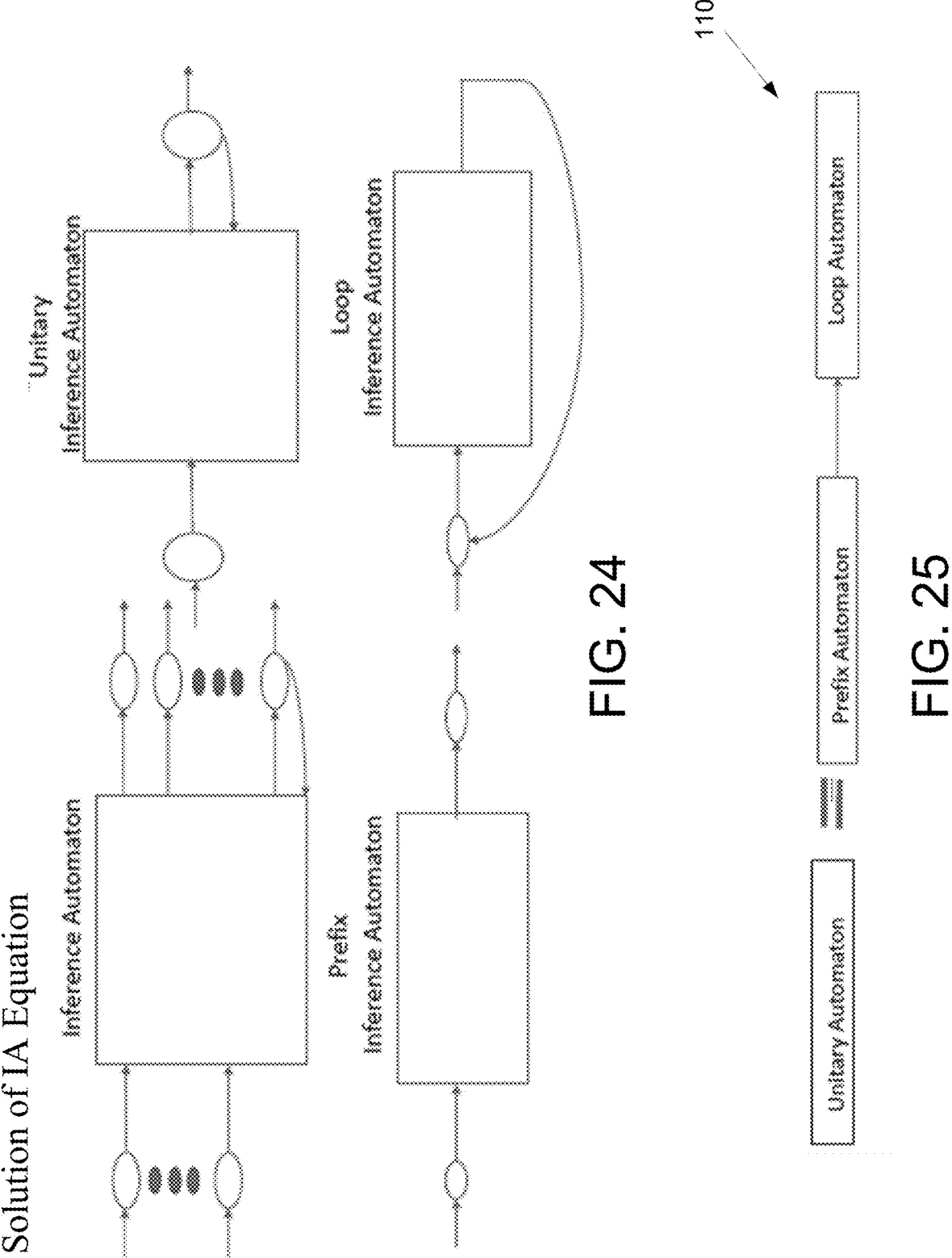
FIG. 24 is a schematic block diagram illustrating one embodiment of inference automaton decomposition.
FIG. 25 is a schematic block diagram illustrating one embodiment of inference automaton decomposition.

FIGS. 24 and 25 shown a block diagram of inference automaton decomposition. N inputs to the IA and M outputs from the IA are decomposed into N×M unitary IA's.

Figure 26:
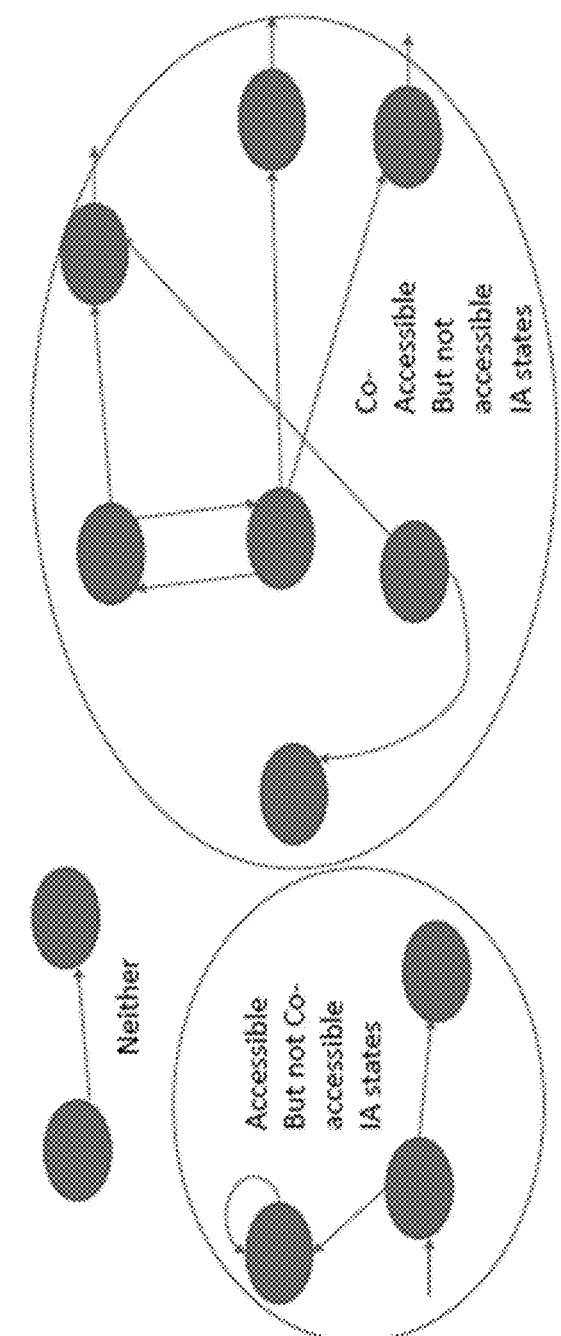
FIG. 26 is a schematic block diagram illustrating one embodiment of aggregation of the inference automaton.
Figure 31:
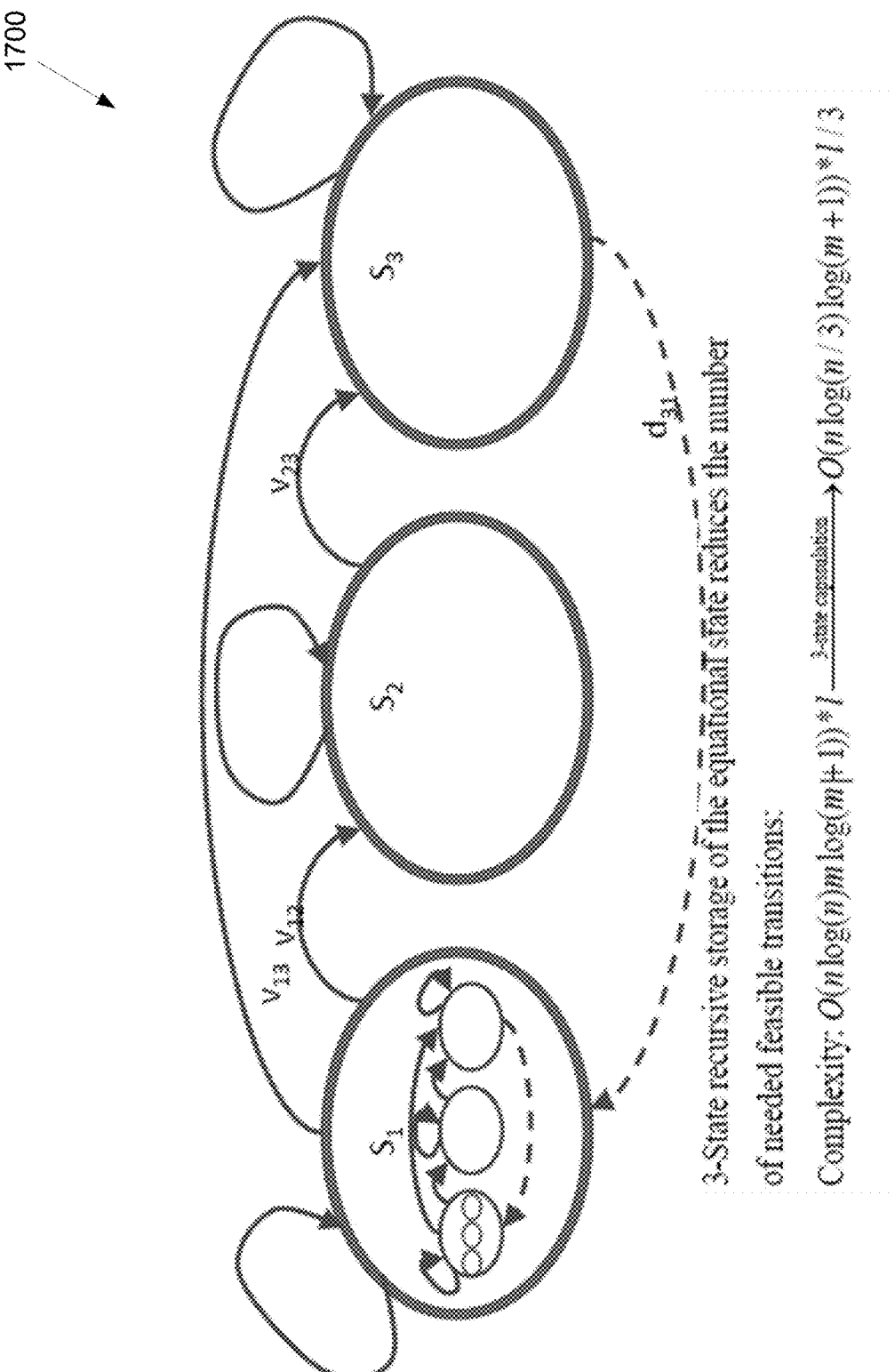
FIG. 31 is a flow diagram illustrating one embodiment of stage transitions.

FIG. 26 shows aggregation of the IA in a recursive 3 state group into reduce execution complexity. FIG. 31 also shows resulting paths form inference automaton that do not provide a solution.

Figure 27:
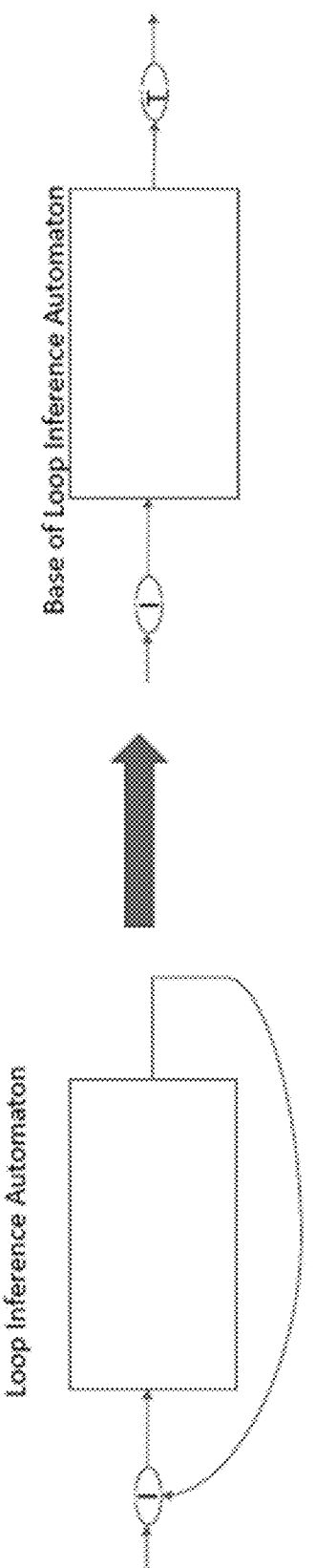
FIG. 27 is a schematic block diagram illustrating one embodiment of automaton unitary decomposition components.
Figures 28, 29:
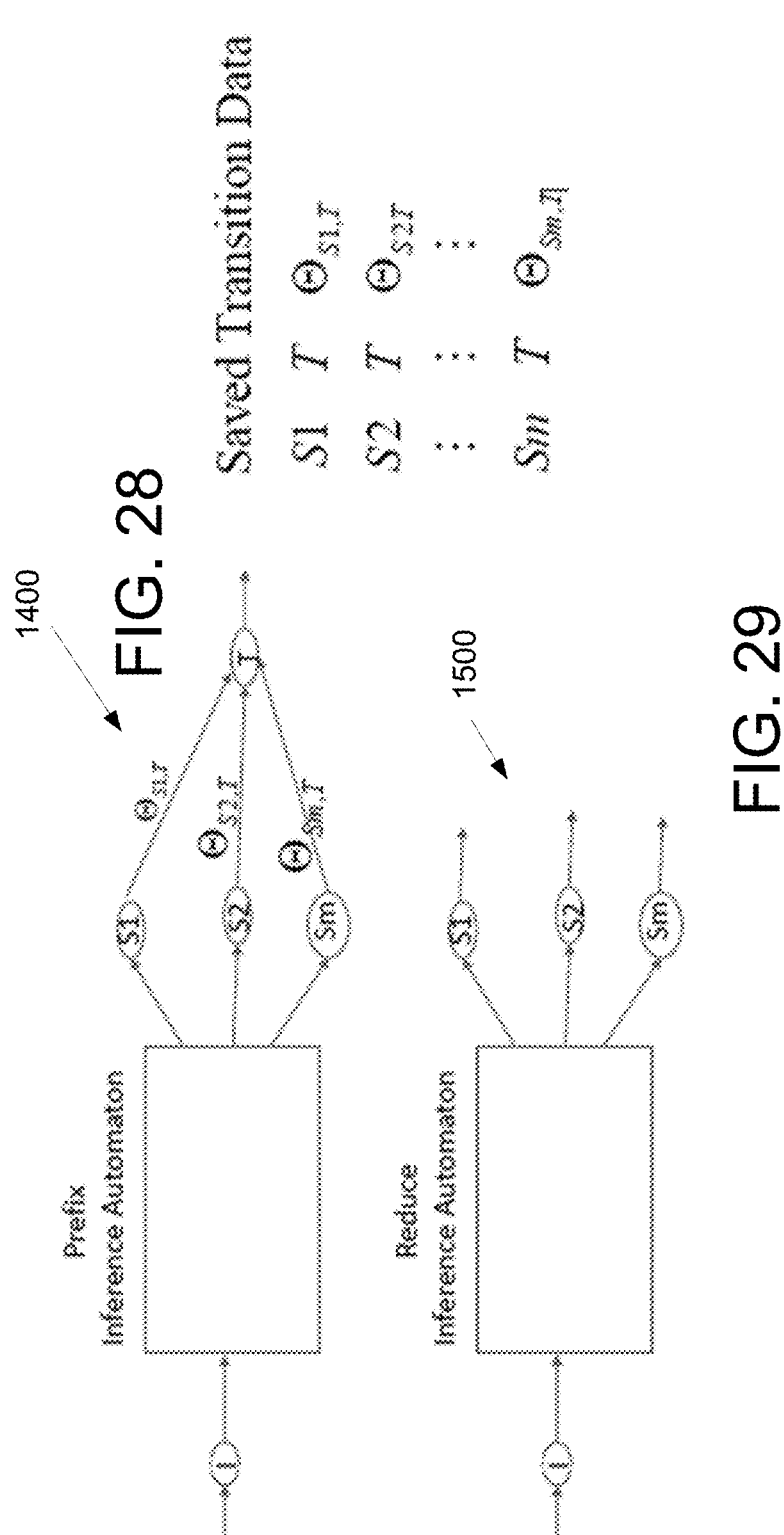
FIG. 28 is a schematic block diagram illustrating one embodiment of automaton unitary decomposition components.
FIG. 29 is a schematic block diagram illustrating one embodiment of automaton unitary decomposition components.

FIGS. 27-29 show automaton unitary decomposition components. Base of loop IA creates a terminal state T not included in the states of the original loop automaton, connects to T all the transitions terminating in state I, trims resulting unitary IA, and trims automaton is base of the loop automaton.

Figure 30:
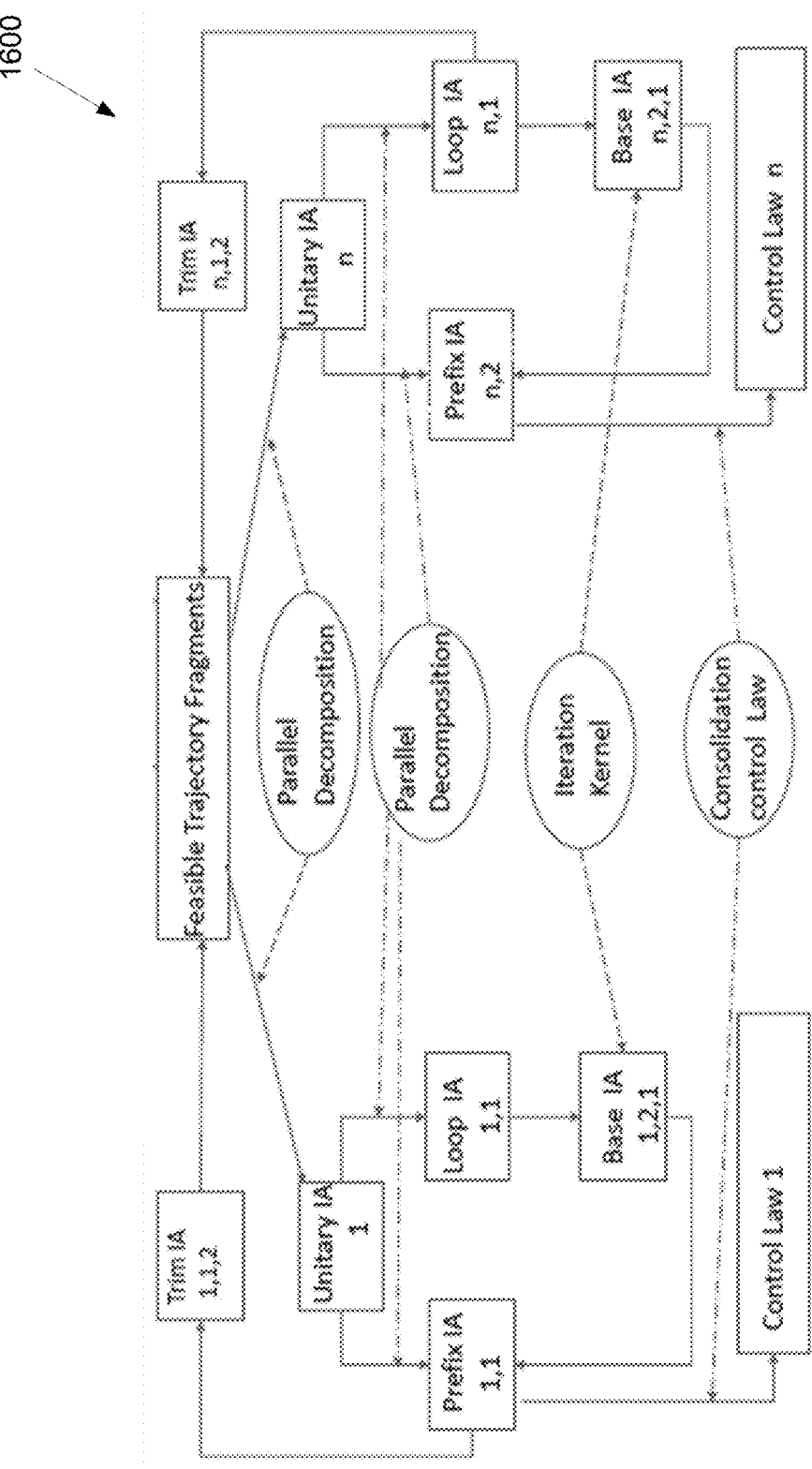
FIG. 30 is a flow diagram illustrating one embodiment of inference automaton execution.

FIG. 30 shows an inference automaton execution process.

FIG. 31 shows a 3-state recursive storage of equational state to reduce the number of needed feasible transitions.

A decomposable, iterative implementation of blob multistage DP is developed. Concurrency transitions (decision) law is provided by the IA. The IA computes iterative partial forms of the feedback blob transition law as a function of the Dynkin operators associated with the DP equation. The state of the computation of a chain stage is given by partial instantiations of Dynkin equational forms that characterize the state of the corresponding node.

Figure 32:
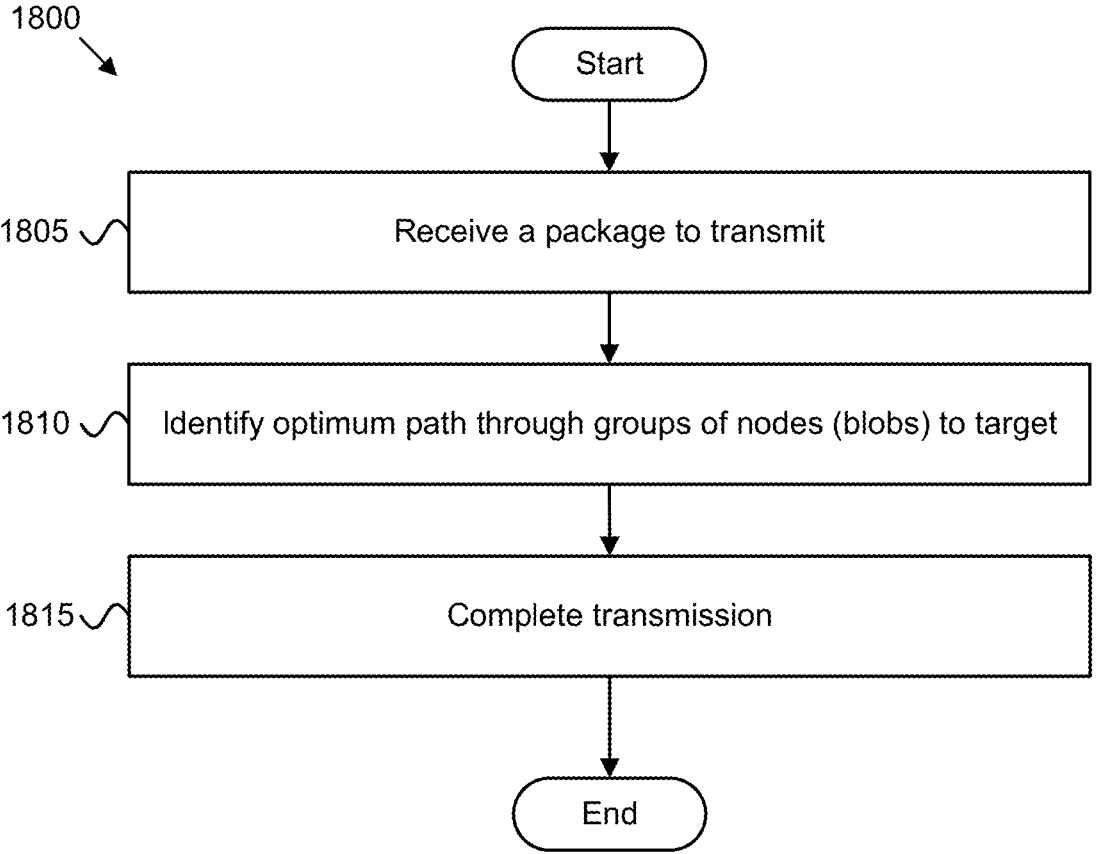
FIG. 32 is a flow diagram illustrating one embodiment of routing from a source to a target in a network environment.

Referring to FIG. 32, a flow diagram of a method 1800 provides routing from a source to a target in a network environment having many network nodes lumped into groups of nodes or blobs. At a block 1805, a data package is received from the source for delivery to the target. At a block 1810, an optimum path through the network (blobs) to the target is identified. At a block 1815, transmission of the data packet to the target is completed based on the identified optimum path.

Figure 33:
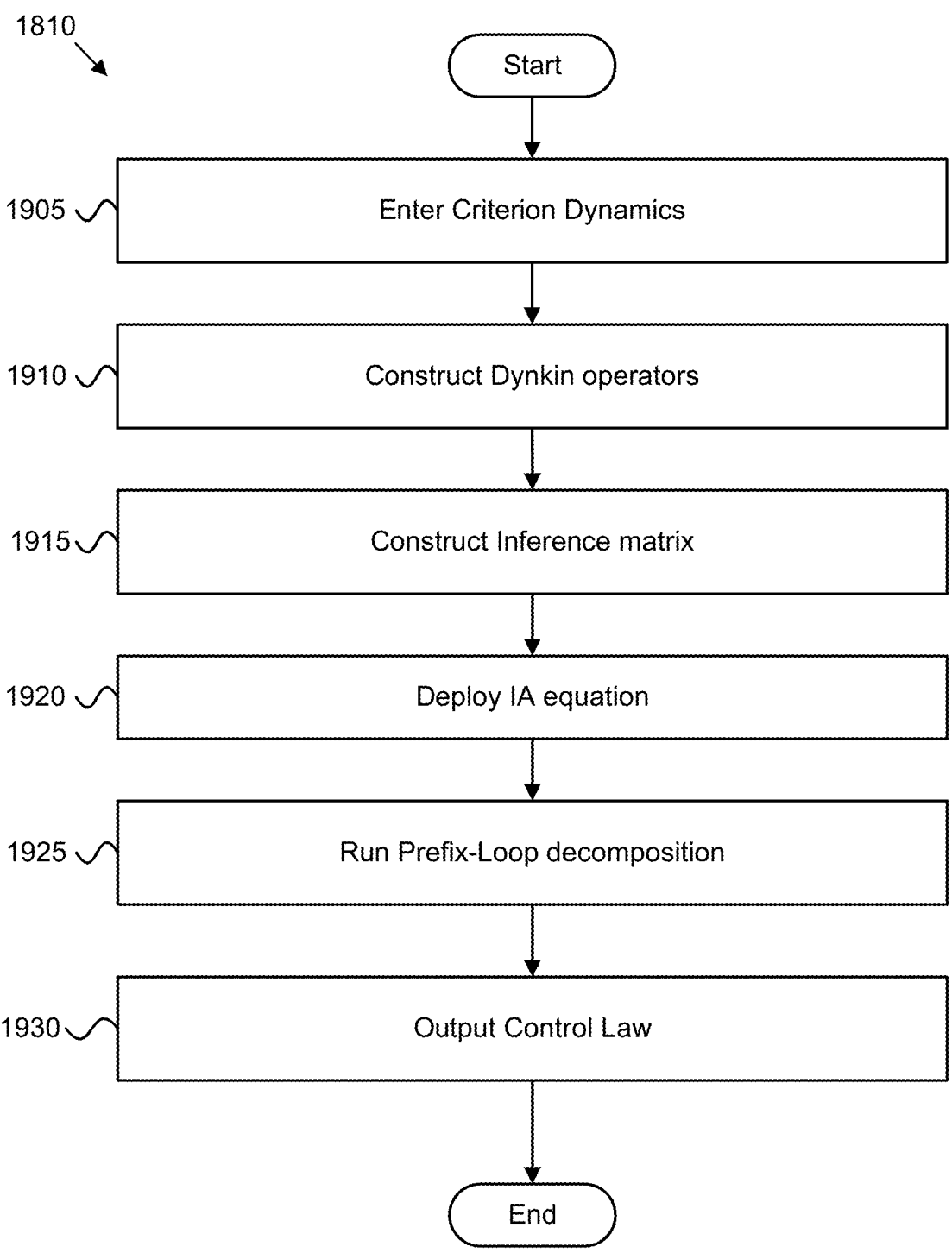
FIG. 33 is a flow diagram illustrating one embodiment of routing from a source to a target in a network environment.
Figure 34B:
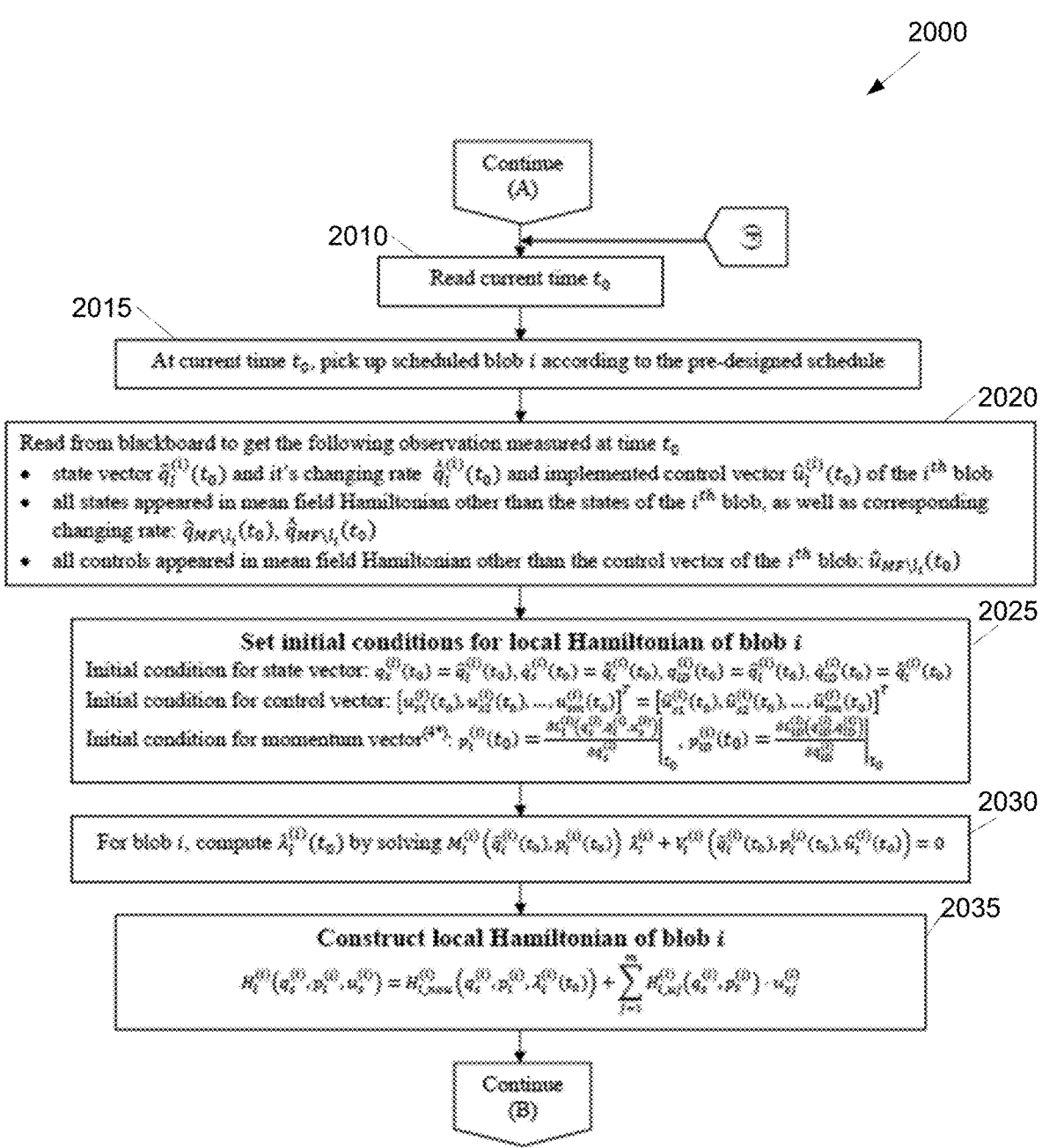
Figure 34C:
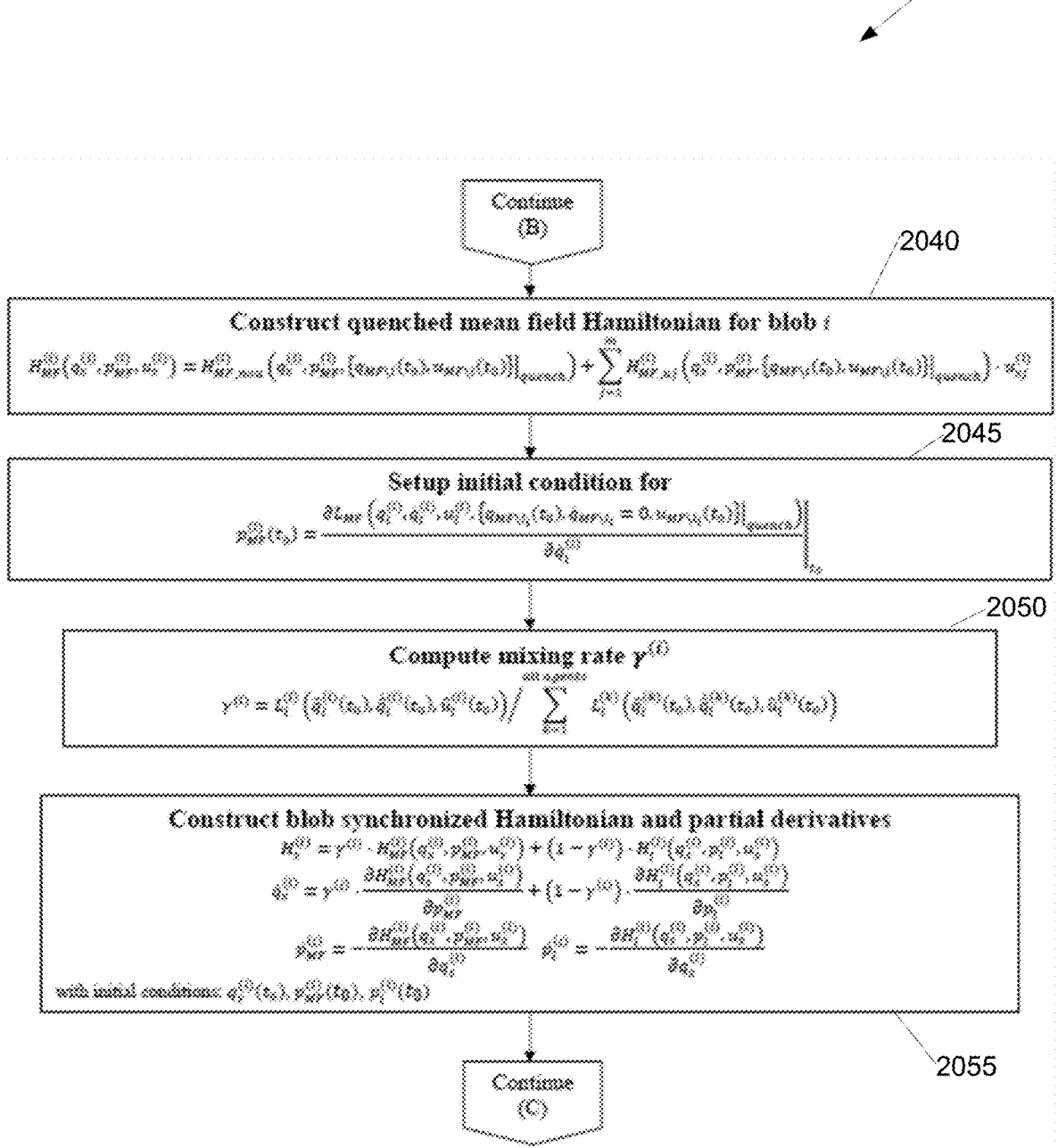
Figure 34D:
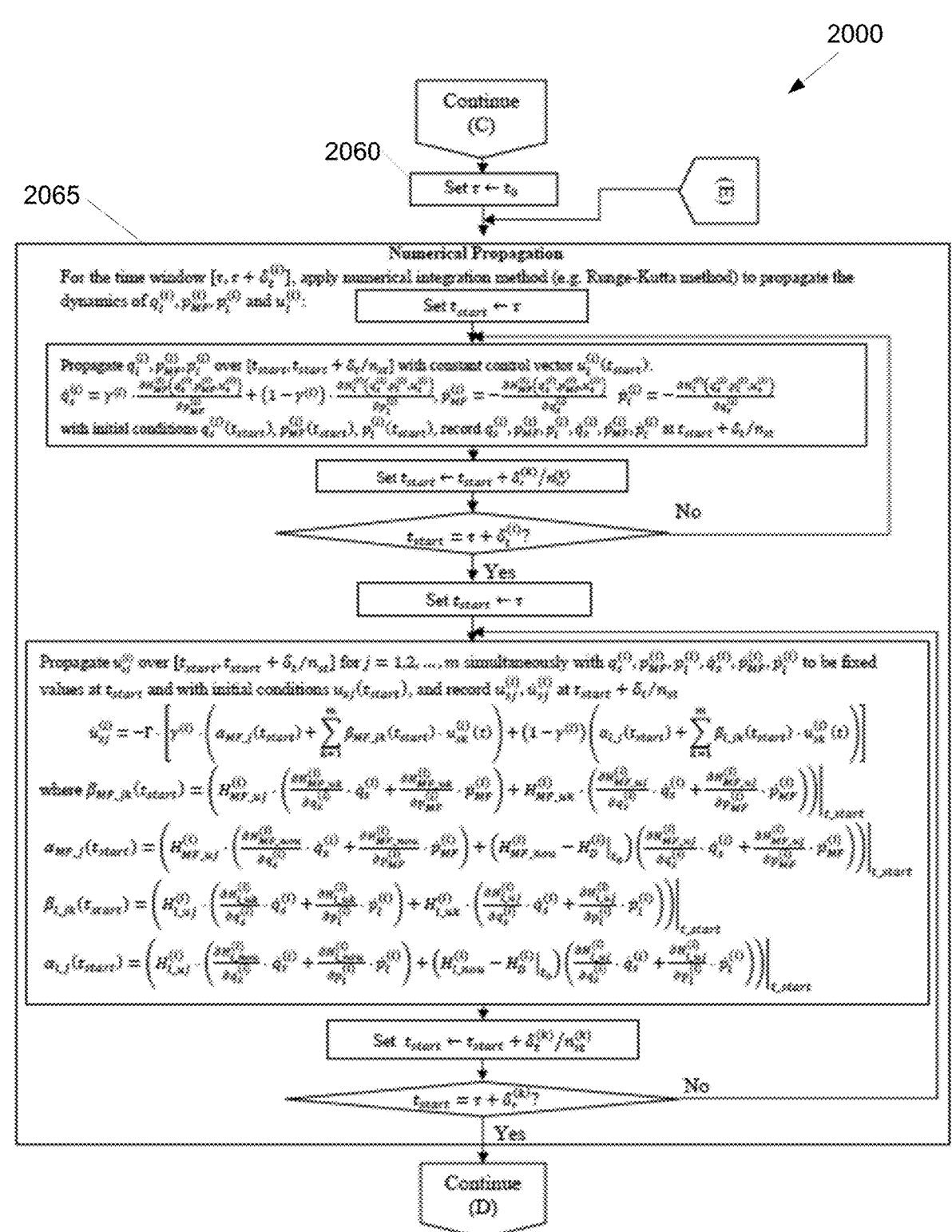
Figure 34E:
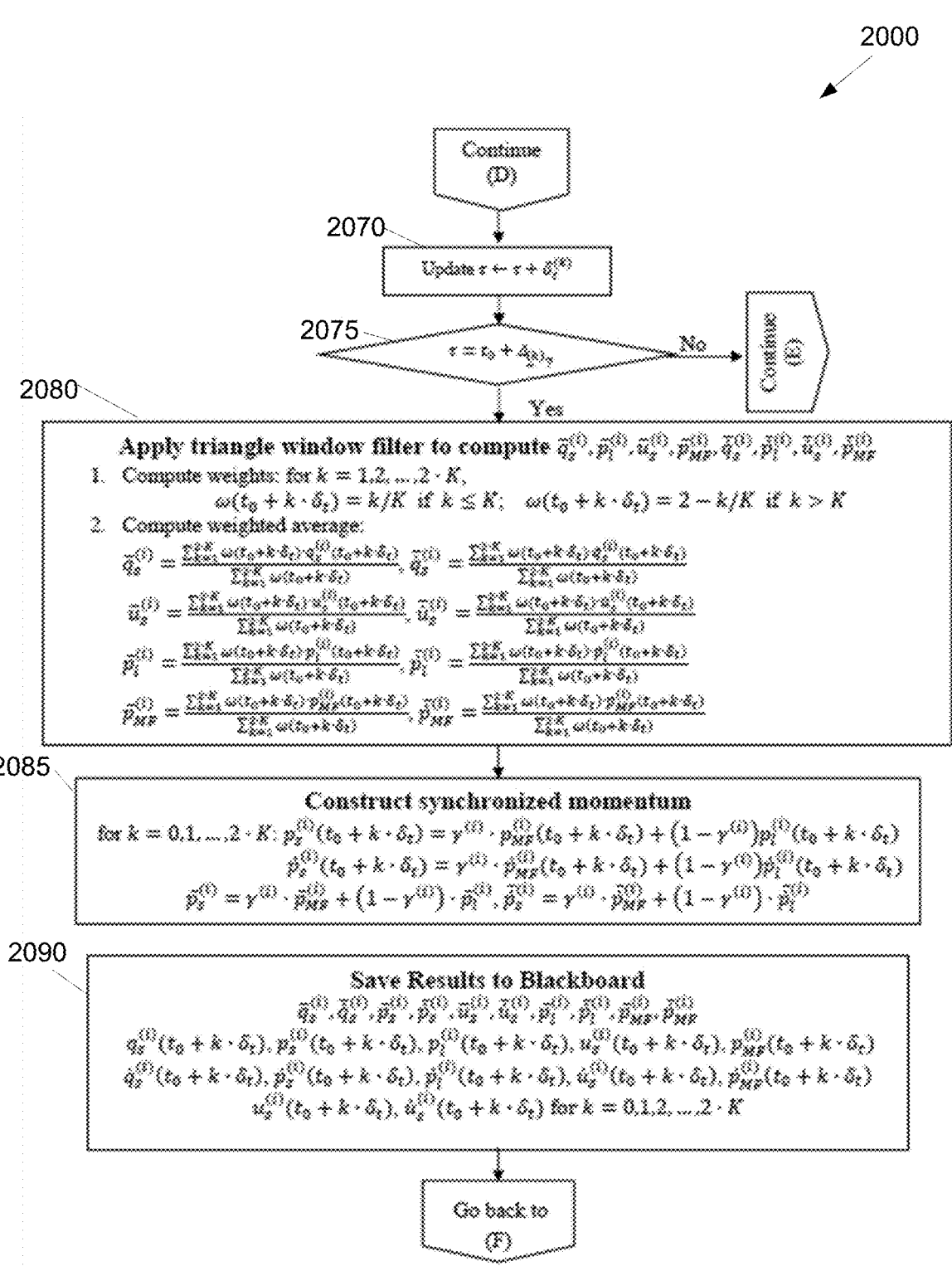

Referring to FIG. 33, a flow diagram that provides additional details for the step 1810 of the method 1800 of FIG. 32. At a block 1905, criterion dynamics are entered. At a block 1910, Dynkin operators are constructed based on the criterion dynamics. At a block 1915, an Inference matrix is constructed based on the Dynkin operators. At a block 1920, an IA equation is deployed based on the Inference matrix. At a block 1925, Prefix-Loop decomposition is run to generate a control law. At a block 1930, the control law is outputted.

FIGS. 34A-E show a detailed implementation process of the inference automaton process. At a block 2005, initialization of parameters occurs. The initial parameters include window length, number of blobs to be sampled in a half window, buffer size, number of steps within a time segment. At a block 2010, current time is read. At a block 2015, at a current time scheduled blob is picked up according to a pre-designated schedule. At a block 2020, a blackboard is read to get observations measured at the current time. The observations include a state vector and state vector changing rate, implemented control vector of the current blob, and all states and all controls appearing in mean field Hamiltonian other than the current blob. At a block 2025, initial conditions for local Hamiltonian of blob i is set. The initial conditions include state vector, control vector, and momentum vector. At a block 2030, a λ value is computed for blob i. At a block 2035, a local Hamiltonian of blob i is constructed using the initial parameters and other previously calculated values. At a block 2040, a quenched mean field Hamiltonian for blob i is constructed using previously created parameters. At a block 2045, initial conditions are set up. At a block 2050, a mixing rate is computed. At a block 2055, blob synchronized Hamiltonian and partial derivatives are constructed. At a block 2060, a time value is set. At a block 2065, numerical propagation is performed. Blocks 2070 and 2075 relate to updating a time value. At a block 2080, a triangle window filter is applied to compute various values. At a block 2085, synchronized momentum is constructed. At a block 2090, the synchronized momentum results are saved to a blackboard.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
receiving criterion dynamics;
constructing Dynkin operators in response to the criterion dynamics;
constructing an inference matrix in response to the Dynkin operators;
deploying an inference automaton equation in response to the inference matrix;
performing prefix-loop decomposition to generate a control law; and
outputting the control law.

2. The method of claim 1, wherein outputting the control law comprises outputting the control law to a blackboard.

3. The method of claim 1, further comprising computing iterative partial forms of feedback blob transition law as a function of the Dynkin operators.

4. The method of claim 1, further comprising generating feedback decision flow of blob trajectories in response to the control law.

5. An apparatus for wireless communication, the apparatus comprising:
a processor; and
a memory coupled to the processor, the processor configured to cause the apparatus to:
receive criterion dynamics;
construct Dynkin operators in response to the criterion dynamics;
construct an inference matrix in response to the Dynkin operators;
deploy an inference automaton equation in response to the inference matrix;
perform prefix-loop decomposition to generate a control law; and
output the control law.

6. The apparatus of claim 5, wherein the control law is outputted to a blackboard.

7. The apparatus of claim 5, wherein the processor is further configured to cause the apparatus to compute iterative partial forms of feedback blob transition law as a function of the Dynkin operators.

8. The apparatus of claim 5, the processor is further configured to cause the apparatus to generate feedback decision flow of blob trajectories in response to the control law.

\* \* \* \* \*